US005943314A

United States Patent [19]
Croslin

[11] Patent Number: 5,943,314
[45] Date of Patent: Aug. 24, 1999

[54] METHOD AND SYSTEM OF DISTRIBUTED NETWORK RESTORATION WITH MULTIPLE FAILURES

[75] Inventor: William D. Croslin, Colorado Springs, Colo.

[73] Assignee: MCI Communications Corporation, Washington, D.C.

[21] Appl. No.: 08/777,437

[22] Filed: Dec. 30, 1996

[51] Int. Cl.$^6$ ............................. H04I 15/00; H04L 12/28
[52] U.S. Cl. ............................................................. 370/216
[58] Field of Search ..................................... 370/216, 217, 370/218, 221, 222, 237, 248, 249, 225, 228; 395/200.69, 181, 182.01, 182.02; 340/827, 825.01, 826, 825.05, 825.16

[56] References Cited

U.S. PATENT DOCUMENTS

| | | | |
|---|---|---|---|
| 4,577,066 | 3/1986 | Bimonte et al. | 179/18 |
| 4,920,529 | 4/1990 | Sasaki et al. | 370/16 |
| 5,187,740 | 2/1993 | Swaim et al. | 379/209 |
| 5,235,599 | 8/1993 | Nishimura et al. | 371/11.2 |
| 5,335,268 | 8/1994 | Kelly, Jr. et al. | 379/112 |
| 5,459,716 | 10/1995 | Fahim et al. | 370/16 |
| 5,463,615 | 10/1995 | Steinhorn | 370/16 |
| 5,537,532 | 7/1996 | Sinclair et al. | |
| 5,636,203 | 6/1997 | Shah | 370/244 |
| 5,646,936 | 7/1997 | Shah et al. | 370/228 |
| 5,657,320 | 8/1997 | Russ et al. | 370/217 |
| 5,781,535 | 7/1998 | Russ et al. | 370/248 |
| 5,835,482 | 11/1998 | Allen | 370/225 |

FOREIGN PATENT DOCUMENTS

| | | |
|---|---|---|
| 0 494 513 A2 | 12/1991 | European Pat. Off. . |
| 0 568 265 | 11/1993 | European Pat. Off. . |
| WO 95/10149 | 4/1995 | WIPO . |

OTHER PUBLICATIONS

Herzberg et al. "The Hop–Limit Approach for Spare–Capacity Assignment in Survivable Networks" IEEE Dec. 3, 1995.

Dighe, et al. "A Link Based Alternative Routing Scheme for Network Restoration under Failure" IEEE May 1995.
Grover et al. "Near Optimal Spare Capacity Planning in a Mesh Restorable Network" IEEE Jan. 1991.
Hasegawa et al. "Dynamic Reconfiguration of Digital Cross– Connect Systems with Network Control and Management" IEEE.
Bellary, et al. "Intelligent Transport Network Survivability: Study of Distributed and Centralized Control Techniques" IEEE 1990.
Shimazaki et al. "Neopilot: An Integrated ISDN Fault Management System" IEEE Feb. 1990.
Shimazaki et al. "Network Fault Management" Sep. 1992.
Newport, et al. "Network Survivability Through Connectivity Optimization" IEEE 1987.

(List continued on next page.)

*Primary Examiner*—Michael Horabik
*Assistant Examiner*—M. Phan

[57] ABSTRACT

A system for establishing a restoral route to bypass multiple failed components in a communications network. The network has components that include nodes and links. Each link connected to a node is either an input or an output link for that node. When a component failure is detected on a output link of a node, the system selects a source node and a target node for the restoral route and effects the sending of messages through an output links of the source node to establish a restoral route to the target node. When a message to establish a restoral route to the target node is received at a node, the node forwards the message through its output links. When a message that a restoral route has been established to the target node is received through an output link of a node, the node connects the input link through which the message to establish a restoral route was received to the output link and forwards the message that a restoral route has been established through the input link. When a message that a restoral route has not been established to the target node is received through each output link of a node, the node forwards the message that a restoral route has not been established through the input link. Thus, the nodes of the network send messages to one another to effect the establishing of a restoral route in a distributed and dynamic manner.

27 Claims, 17 Drawing Sheets

OTHER PUBLICATIONS

Flanagan et al. "Principles and Technologies for Planning Survivability—A Metropolitan Case Study", IEEE 1989.

M. Wehr "Protection of Synchronous Transmission Networks", Commutation and Transmission, No. 4, 1993.

Coan, et al. "Using Distributed Topology Update and Preplanned Configurations to Achieve Trunk Network Survivability" IEEE Oct. 1991.

Manione et al. "An Inconsistencies Tolerent Approach in the Fault Diagnosis of Telecommunications Networks" Feb. 14, 1994.

Bouloutas, et al. "Alarm Correlation and Fault Identification in Communication Networks" Feb. 1, 1994.

"Self–Healing Techniques Utilizing Virtual Path Concept for ATM Networks", Ryutaro Kawamura, et al.—Electronics & Communications in Japan, Pt. I–Communications; vol. 75, No. 4; Apr. 1, 1992, pp. 85–95.

"Using Distributed Topology Update and Preplanned Configurations to Achieve Trunk Network Survivability", Coan B.A., et al.,—IEEE Transactions on Reliability; vol. 40, No. 4; Oct. 1, 1991; pp. 404–416.

"A Distributed Link Restoration Algorithm with Robust Preplanning", Baker, J.E.—Countdown to the new Millennium; vol. 1, No. _, Dec. 2, 1991; pp. 306–311.

METHOD AND SYSTEM OF DISTRIBUTED NETWORK RESTORATION WITH MULTIPLE FAILURES

TECHNICAL FIELD

The present invention relates to communication systems and, in particular, the restoring of routes after a communications failure.

BACKGROUND OF THE INVENTION

In the telecommunications field, telecommunications carriers (e.g., long distance providers) continually strive to increase the reliability of their telecommunications networks. A telecommunications network consists of a collection of network nodes interconnected via transmission lines. Traffic is transmitted on the network from one endpoint to another endpoint through a current route, which is a network path that specifies the transmission lines that interconnect the endpoints. The main path (i.e., trunk) through the network is referred to as the original route. The network nodes may serve a variety of functions such as amplifying the network traffic for transmission down the next transmission line in the route or establishing an interconnection between two transmission lines connected to the node (i.e., a switch). Unfortunately, the components (e.g., nodes and transmission lines) of the transmission network may occasionally fail. For example, a transmission line that is a buried fiber optic cable may fail as a result of being inadvertently severed by someone digging near the buried cable.

If one or more of the cables fail, massive disruption of services to a large number of network customers could result. Therefore, telecommunications carriers strive to quickly and economically route the network traffic around such failed components by establishing a "restoral" route. A restoral route is a portion of a path between the endpoints that does not include the failed component. The establishing of a restoral route generally involves: (1) detecting that a component on the current route has failed, (2) identifying the location of the component, (3) selecting a restoral route to bypass the failed component, and (4) implementing the selected restoral route. The reliability of telecommunication networks depends in large part on the ability to detect such failures and implement the restoral route with minimal impact on network customers.

Telecommunications carriers typically develop "pre-planned" restoral routes that are used when various components fail. The development of such pre-planned restoral routes has several disadvantages. One disadvantage is that the amount of time needed to develop the restoral route for network can increase exponentially with the size of the network. To develop the restoral routes, a telecommunications carrier typically collects large amounts of data relating to the telecommunications network. This data can include the topology of the network, speed of network components, and relative costs of the network components. A network analyst then analyzes the collected data and identifies the pre-planned restoral routes that would result in minimal impact on network customers both in terms of cost and service. The analyst typically needs to identify a pre-planned restoral route for each component that could possibly fail. A second disadvantage is that the pre-planned restoral routes cannot realistically take into consideration every possible combination of component failures. Thus, the pre-planned restoral routes may not be an optimal restoral route given the combination of failures that have occurred. A third disadvantage is that the pre-planned restoral routes cannot adjust to the dynamic nature of the network. The topology of a telecommunication network can be dynamic, that is components can be added, removed, and changed frequently. Therefore, these pre-planned restoral routes may fail because they were developed from outdated data. Consequently, each time the topology changes new pre-planned restoral routes may need to be developed.

When a failure does occur on a telecommunications network, an analyst needs to identify the location of the component that failed and then to select the pre-planned restoral route to implement. To determine where in the network a failure has occurred, a central location often receives various alarms from the network, which are generated in response to the failure. With the aid of numerous algorithms performed to correlate the various alarms based on the network topology, the analyst then matches the alarms to the network topology to identify the location of the failure within the network. After locating the failure, the analyst can then select the appropriate pre-planned restoral route. Locating a failure within the network requires extensive processing, particularly with large networks. Such extensive processing necessarily requires processing time, and therefore increases the delay in selecting and, thus implementing, the restoral route.

SUMMARY OF THE INVENTION

The present invention provides a method and system for dynamically identifying a restoral route that bypasses multiple failed components in a network. The network comprises components that include restoration nodes and links. One end of a link is connected to an output (source) port of a node, and the other end of the link is connected to an input (target) port of a node. The restoral route is defined to start at a source node and end at a target node. The system of the present invention is distributed and dynamic in that various nodes participate in the identifying of a restoral route when a failure is detected.

Each node performs the following processing to identify the restoral route. When a failure is detected, one node is designated as the arbitrator node. The arbitrator node selects the source node and notifies the source node that it has been selected as the source node. The source node selects a target node and sends a message through its output links to identify a restoral route. When a message to identify a restoral route to a target node is received at a node, the node forwards the message to other nodes connected to its output links. If, however, the node that receives the message is the target node, then the target node sends a message that the restoral route has been identified to the node that sent the message to identify a restoral route. When a message that a restoral route has been identified is received at a node, the node forwards that message to the node that sent the message to identify a restoral route. If, however, that node that receives the message that a restoral route has been identified is the source node, then the restoral route has been successfully identified. When a node determines that a restoral route cannot be identified through any of its output links, the node sends a message that a restoral route cannot be identified to the node that sent the message to identify a restoral route. When a message that a restoral route cannot be identified is received through each output link of a node, the node sends a message that a route cannot be identified to the node that sent the message to identify the restoral route. In this way, the restoral route can be dynamically generated in a distributed manner.

When a failure occurs on the original route, then the node that detects the failure on its output port is designated as the arbitrator node. When a second failure occurs that is on the restoral route, then the node that was designated as the arbitrator node when the restoral route was established is again designated as the arbitrator node. Thus, the arbitrator node is always on the original route. In this way, the arbitrator node can control the establishing of the restoral route based on information stored in the nodes of the original route.

DETAILED DESCRIPTION OF THE INVENTION

Figure 1A:
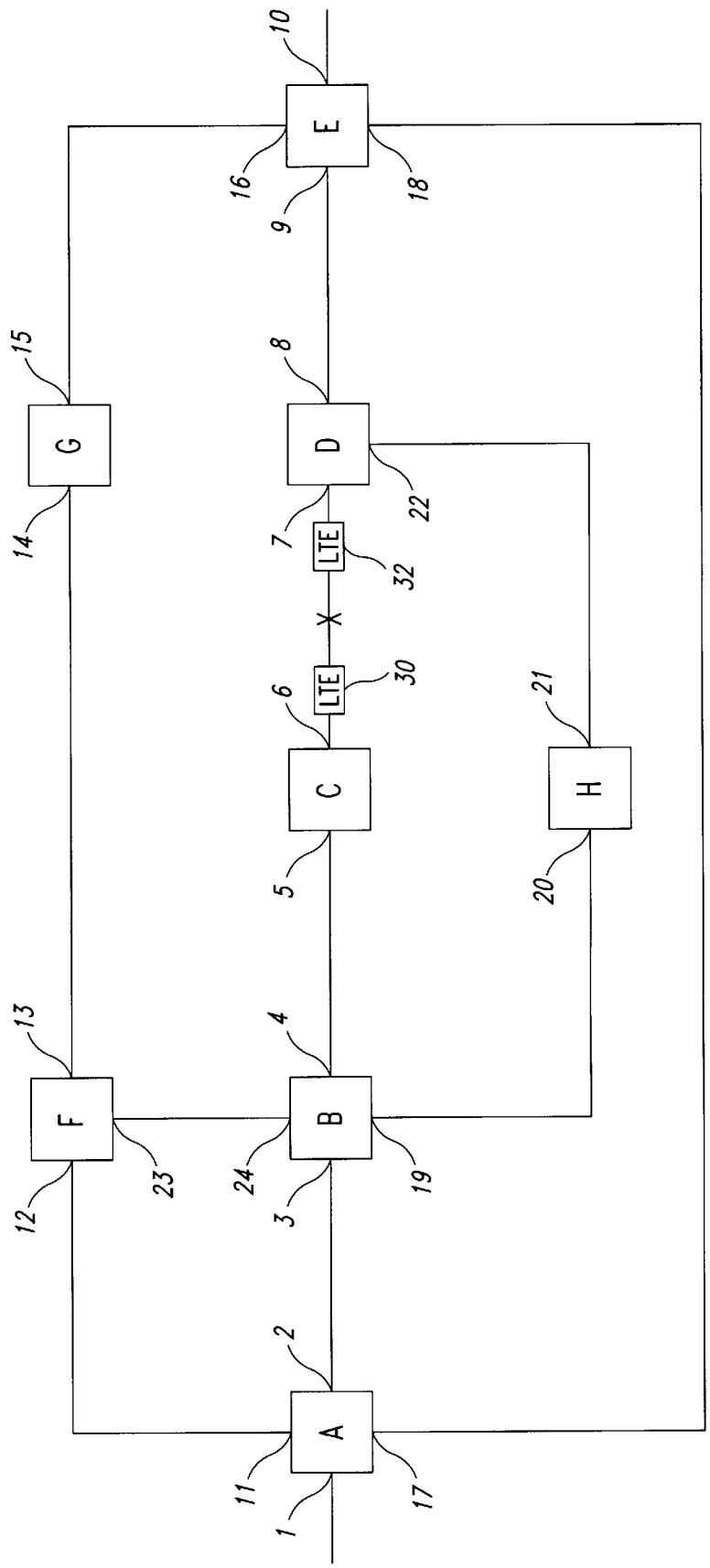
FIGS. 1A and 1B are block diagrams of an example network topology.

The present invention provides a method and system for dynamically building and implementing restoral routes when multiple network failures occur. When a network failure is first detected on the original route, a restoral route is identified to bypass the failed component. The new route includes a portion of the original route and the restoral route. In a preferred embodiment, the "restoration" nodes of the network identify the location of the failure and participate in the building of the restoral route in a distributed manner. A restoration node is a node that can dynamically switch an input (target) transmission line to be connected to different output (source) transmission lines. The transmission lines are connected to the restoration nodes via input and output ports. When a failure is detected, a node is designated as the arbitrator node for building the restoral route. The arbitrator node selects a source node. The source and target nodes are the nodes that will be switched to route traffic from a portion of the original route onto the restoral route. The arbitrator node notifies the source node that it has been selected as the source node, and the source node selects a target node. If a restoral route cannot be established starting at the source node, then the arbitrator node has the responsibility to select the next source node through which to attempt to establish a restoral route.

When multiple failures occur on the original route, then any node that is in the portion of the original route between the failures is not designated as an arbitrator node. Since those nodes are isolated from the originating and destination nodes of the original route, as arbitrator nodes those nodes could not effectively notify possible source nodes on the non-isolated portion of the original route. That is, those nodes in between the failures may be completely isolated from the other portions of the original route. Thus, any node that receives an indication of a failure on both its input and output ports is not designated as the arbitrator node. In general, when a failure occurs on a portion of the original route, then the node that receives direct notification of the failure on its output link is designated as the arbitrator node. Conversely, when a failure occurs on a restoral route, the last node of the original route to be designated as the arbitrator node is again designated as the arbitrator node.

When the source node is notified that it is the source node, it starts the process of identifying a restoral route to the target node. The source node sends messages through its output ports requesting whether the node at the end of the output link can establish a route to the target node. Each node that receives such a message in turn forwards the message through its output ports. Eventually, if a restoral route can be established from the source node to the target node, then the target node will receive that forwarded message. The target node then sends a reply message indicating that a restoral route has been built. Each node on the restoral route, when it receives that reply message, implements its portion of the restoral route. Eventually, the source node receives the message and implements its portion of the restoral route to complete the establishing of the restoral route. If a node detects that an output link is down or receives a message through an output port indicating that a route cannot be established from that node to the target node through that output port, the node selects another output port and attempts to establish a route to the target node through that other output port. If no route can be established to the target node through any of its output ports, the nodes send an unsuccessful message to the node that sent the request to establish a route to the target node.

When the restoral route is established, it becomes part of the then current route. However, a second network failure may occur on the then current route. The second failure may occur either on the portion of the original route that is part of the then current route or on the restoral route. As discussed above, if the second failure occurs on the restoral route, then the node that was designated as the arbitrator node when the first failure occurred is designated as the arbitrator node for establishing the restoral route to bypass the second failure. That same arbitrator node is designated because the preferred restoral route for the original route is desired and not the preferred restoral route for the then current route. If the second failure occurs on a portion of the original route, then the arbitrator node is designated as that node that detects the failure. Since that node is on the original route, the restoral route that it arbitrates will be preferred. When an arbitrator node is designated, it selects a source node for the restoral route and the process of establishing a restoral route continues as described above for when the first failure occurred.

The detecting of a failure and establishing of a restoral route is dynamic and distributed. It is dynamic because the restoral route is not built until the failure is detected and is distributed because various nodes participate in the building of the restoral route. Each restoration node in the network can detect a failure that occurs between it and the next restoration node in the current route. When a failure is detected by a restoration node, the arbitrator node initiates the process of building and implementing a restoral route. First, the arbitrator node identifies a source node. The source node will be the first node in the restoral route. Each restoration node may have one or more preferred source nodes that are preferably predetermined prior to detecting a failure. Second, the arbitrator node then sends a notification to a preferred source node requesting that it start building a restoral route. When the preferred source node receives the notification, it identifies a preferred target node. The preferred target node will be the last node in the restoral route. That is, the restoral route will be routed from the source node to the target node to bypass the failed component. The source node selects an output port through which to attempt to establish a restoral route to the target node. The source node then sends a build restoral route message through the selected output port. The build restoral route message identifies the target node of the restoral route. Each restoration node that receives a build restoral route message determines whether a route (direct or indirect) can be established through one of its output ports to the target node. A restoration node determines whether such a route can be established by selecting an output port through which a route may be established to the target node and by sending a build restoral route message through the selected output port. Eventually, a restoration node will send a build restoral route message to the target node, which indicates that a restoral route from the source node to the target node can be established as the route traveled by the message from the source node to the target node. The target node then connects the input port on which it received the build restoral route message to the output port that is on the current route. The target node then sends an implement restoral route message to the node that sent to it the build restoral route message. When a node receives an implement restoral route message, it connects the input port through which it received the build restoral route message to the output port through which it received the implement restoral route message. The node will then forward the implement restoral route message through the input port through which it received the build restoral route message. Eventually, the source node will receive the implement restoral route message, and it will connect its input port for the current route to the output port through which it received the implement restoral route message to complete the establishing of the restoral route.

A node that receives a build restoral route message may not be able to establish a route to the target node. The topology of the network may have changed and certain links have been removed or re-routed or a link may have failed. Thus, the restoral route cannot include that node. If a node cannot be part of a restoral route, it notifies the node that sent the build restoral route message that the building of the restoral route through that node was unsuccessful. Each node that receives such a build restoral route unsuccessful message attempts to continue building a restoral route through another of its output ports. If no restoral route can be built through any of its output ports, the node sends a build restoral route unsuccessful message to the node that sent it the build restoral route message. Eventually, the source node will receive a build restoral route unsuccessful message. The source node then selects another output port through which a restoral route could be built to the target node. If the source node is unsuccessful in building a restoral route to the target node through any of its output links, it selects another target node and repeats the process of attempting to establish a restoral route to that newly selected target node. Eventually, the source node may find that it cannot be the source node in any restoral route and sends a message to the arbitrator node. The arbitrator node can then select another node to be the source node of the restoral route, sends a message to that newly selected source node, and the process is repeated.

If a failure occurs on the restoral route, the node that detects the failure on its output port is not designated as the arbitrator node. Rather, that node sends a notification to the source node of the restoral route. When the source node receives that notification, it determines that a failure has been detected on the restoral route. The source node then connects the input port to the output port for original route and sends a message to the arbitrator node designated when the last failure was detected that caused the restoral route to be established. When that arbitrator node receives the message, it selects a source node and notifies the source node to establish a restoral route. That restoral route will necessarily bypass both network failures. Also, that restoral route will be optimized based on preferences of the nodes in the original route. When the source node receives notification of failure on the restoral route, it notifies the nodes along the restoral route to reset their connections to their pre-restoral route settings. Also, when the target node receives notification of failure on the restoral route, it connects its input port to the output port for the original route and notifies the nodes along the restoral route to reset their connections to their pre-restoral route settings.

If a failure occurs on the portion of the original route, rather than on the restoral route, then the node that detects the failure on its output port is designated as the arbitrator node and the processing continues as described above when the first network failure was detected. When the source or target node of the restoral route receives a message indicating that another failure on the original route is detected, that node restores its connection to the original route and sends a clear message along the restoral route. When a node along the restoral route receives the clear message, it resets its connection to its pre-restoral route connection and forwards the message. When the node (target or source) at the other end of the restoral route receives the message, it restores its connection to the original route.

Each restoration node contains a preferred route table for each other restoration node in the network that indicates the output ports of the node, in preferred order, that can be used to build a restoral route to that other node. Each restoration node also contains a preferred node table for each output port indicating preferences for source and target nodes. When a restoration node is an arbitrator node, it selects the source nodes from the preferred node table for the output port through which the failure was detected. When a restoration node is a source node, it selects the target nodes from the preferred node table for the output port through which it was notified that it is the source node.

Figure 1B:
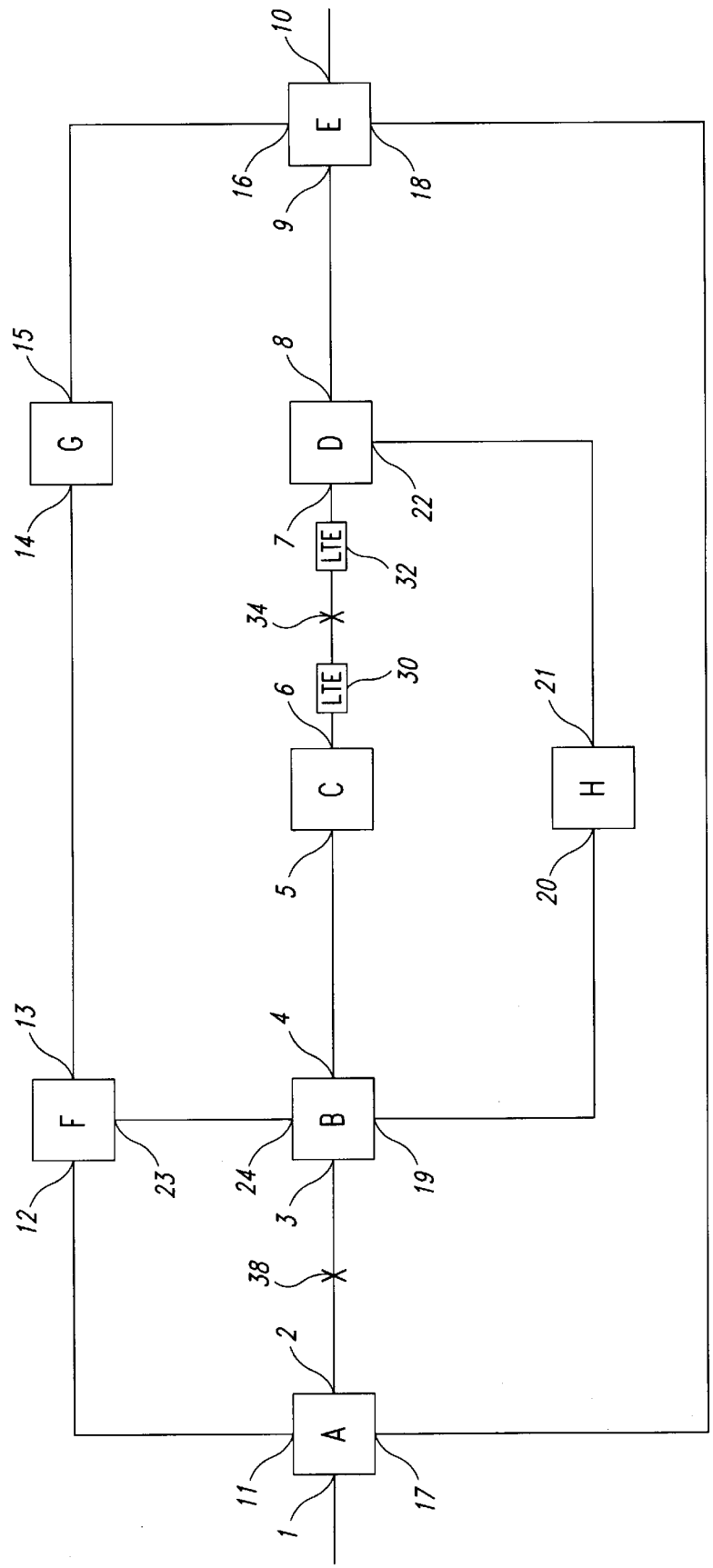

FIGS. 1A and 1B are block diagrams of an example network topology. Nodes A–H represent restoration nodes of a telecommunications network. Typical telecommunication networks consist of many types of nodes (e.g., M-13 sites, digital repeater sites, and switch sites). However, only certain types of nodes are typically used for network restoration. In particular, Digital Cross Connects (DXC), such as DXC 3/3 which switches DS-3 level trunks, are devices that switch transmission lines based on external commands. Thus, nodes that contain DXC devices are considered as restoration nodes. The restoration nodes generally include a computer for controlling the processing of external commands and for switching of the transmission lines. Since only restoration nodes are used to establish a restoral route, only the restoration nodes of the network are shown in FIGS. 1A and 1B. Also, since a connection between any restoration node can include multiple transmission lines and components, the connection is referred to generically as a "link."

Each restoration node has input ports and output ports and can be switched to connect any input port to any output port so that traffic can travel from any input link to any output link connected to the node. Any two nodes may, in general, have multiple links connecting them. That is, nodes A and B could have ports 2' and 3' with another link between them. However, FIGS. 1A and 1B show only one link between the nodes. FIG. 1A shows two light wave transmitting equipment (LTE) devices 30 and 32. The "X" between node C and node D indicates that a network failure has occurred between the LTE devices. When a failure occurs a signal (i.e., an alarm) is sent down the link in both directions to node C and node D.

The original route through the network is identified by the sequence of nodes through which data is transmitted from the originating endpoint, node A, to the destination endpoint, node E, in the network. The original route may be, for example, nodes A-B-C-D-E. However, more generally a route would be identified by both node and port within the node (e.g., A2-B4-C6-D8-E10) since, as discussed above, each pair of nodes may be directly connected by multiple links and the port would identify the link that is part of the original route. The ports 1, 3, 5, 7 and 9 are input ports for the original route and ports 2, 4, 6, 8 and 10 are output ports for the original route.

Each node of the network includes a distributed dynamic restoration (DDR) system that implements the present invention. The DDR system controls all processing to detect a failure and build and implement a restoral route as described in the following. When a failure occurs, the LTE device 30 notifies node C that a failure has occurred. Since node C is on the original route and receives the notification through an output port, node C is the arbitrator node for the establishing of the restoral route. The arbitrator node controls the selecting of source nodes through which to attempt to establish the restoral route. In this example, node C initially selects node B as the source node for the restoral route. When node B receives a message from node C indicating that it is the source node, node B selects node E as the target node. Output ports 19 and 24 are considered to be candidate ports for the restoral route because they could each be on a restoral route. That is, the nodes B-F-G-E or B-H-D-E could be identified as restoral routes. Output port 4, however, is not considered to be a candidate port. Since the notification indicating that node B is the source node was received through output port 4, the restoral route cannot include output port 4. If a restoral route could be identified through output port 4, then the restoration node at the other end of the link connected to output port 4 would typically be selected as the source node.

To establish a restoral route, node B selects a candidate output port and sends a message to build a restoral route through the selected candidate port. For example, node B may initially select port 24 and send a message through output port 24 to node F. The message to build the restoral route includes the identification of the target node. When node F receives the message, it identifies that output port 13 is a candidate port. Node F then sends a build restoral route message through output port 13 to node G. When node G receives the message through input port 14, node G identifies its candidate ports and selects output port 15. Node G then sends a build restoral route message through output port 15 to node E. When node E receives the message, it determines that it is the target node. Consequently, a restoral route from the source node to the target node has been built.

The restoral route is then implemented as B-F-G-E. Each node on the restoral route would implement its portion of the restoral route. Node E first connects input port 16 to output port 10. Node E would then send a message to node G that it should implement its portion of the restoral route. When node G receives the implement restoral route message, it connects input port 14 to output port 15 and sends an implement restoral route message to node F. When node F receives the implement restoral route message, it connects input port 23 to output port 13, sends an implement restoral route message to node B. When node B receives the message, it connects input port 3, part of the original route, to output port 24 to complete the implementation of the restoral route.

However, if the restoral route B-F-G-E could not be established because, for example, the transmission line between nodes G and E had also failed, then a different restoral route is established. When node G receives the build restoral route message from node F, it would detect that the link connected to its only candidate port, output port 15, has failed. Node G would then send a build restoral route unsuccessful message to node F. When node F receives the build restoral route unsuccessful message, node F would then send a build restoral route unsuccessful message to node B. When node B receives the message, node B would then attempt to build a restoral route through its only other candidate port, that is, output port 19. A similar process of attempting to build a restoral route through output port 19 would occur at nodes H, D, and E. If a restoral route could not be built through output port 19, then node B cannot be the source node for the restoral route and would notify the arbitrator node, node C. Node C would then select another node that should serve as the source node for the restoral route. In this example, node C may identify node A as the source node for the restoral route. Node C would then notify node A that it was selected as the source node. Upon receiving the notification that it is the source node for the restoral route, node A would attempt to establish a restoral route through either output ports 11 and 17.

If the restoral route B-F-G-E is established and a failure occurs on the link between nodes G and E, then node G will detect the failure on its output port 15. Since node G is on the restoral route, it does not designate itself as the arbitrator node. Node G, however, notifies the source node of the restoral route that a failure has occurred on the restoral route. When node B receives the notification, it reconnects input port 3 to output port 4, which was the connection of the original route. Node B also notifies the nodes F and G on the restoral route to reset their connection to their pre-restoral route settings. Similarly, when the target node E receives notification of the failure, it reconnects input port 9 to output port 10, which was the connection of the original route. Node E would also have notified nodes on the restoral route to reset their connection. However, in this example, there are no nodes between node E and the failure on the restoral route. Node B also notifies node C, the arbitrator node for the last network failure, that it is again to be designated as the arbitrator node. Node C then selects node B as the preferred source node and notifies node B that it is the source node. The process of establishing the restoral route is then repeated. In this case, since the link between nodes G and E has failed, the attempt to establish a restoral route through node G will be unsuccessful. Therefore, a restoral route of B-H-D-E or A-E may be established.

FIG. 1B illustrates multiple failures on the original route. If the failure at point 38 is detected when the current route is A-B-F-G-E (ie., restoral route B-F-G-E bypasses point 34), then nodes A and B both receive an alarm signal. Since node A is on the original route and it receives the alarm signal through an output port, it is designated as the arbitrator node. Since node B receives the alarm on its input port and it is the source node for the restoral route, it restores its original connection and sends a clear message along the restoral route. Eventually, node E will receive the clear message and restores its original connection. Node A, since it is designated as the arbitrator node, selects a source node, notifies the selected source node, and the process of establishing a restoral route to bypass both failures begins.

The DDR system at each node maintains several tables to help determine the ordering for attempting to establish restoral routes. A preferred technique for maintaining these tables is described in U.S. patent application Ser. No. 08/777,416, entitled "Method For Selecting Preferred Nodes for Distributed Network Restoration." which is being filed concurrently and is hereby incorporated by reference. Each node maintains a preferred route table for each other node in the network and a preferred node table for each of its ports. The preferred route table contains a listing of the output ports of that node that can be used to attempt to build a restoral route from that node to that other node. The listing is sorted according to the order in which the output ports should be used to attempt to build a restoral route. For example, node A may have a preferred route table for node E that contains:

1. Output Port 2
2. Output Port 11
3. Output Port 17

This preferred route table indicates that the preferred restoral route from node A to the target node, node E, is through output port 2. The second preferred route is through output port 11, and the least preferred route is through output port 17. Similarly, node A would have a preferred route table for nodes B, C, D, F, G, and H. The preferred route table for node B may be:

1. Output Port 2
2. Output Port 11

When node A is selected as the source node and node B is selected as the target node, the node A would use the preferred route table for node B to determine the ordering in which it should select output ports for attempting to establish a restoral route to node B. Thus, when a node is requested to build a restoral route to a particular target node, the node selects candidate routes in the order of the output ports in the preferred route table.

The preferred node table of a port identifies the source nodes through which to establish a restoral route should a failure be detected on that output port. The table also identifies the preferred target nodes to which to establish a restoral route when the node receives notification through that output port that it is a source node. The table identifies all possible source and target nodes along with an indication of the order in which the nodes should be selected when establishing a restoral route. For example, the preferred node table for node C may indicate that node B would be the preferred source node of a restoral route around node C and that node A may be the second preferred source node. The preferred node table for node C may be as follows:

| Source: | A2 | B4 | C6 |
|---|---|---|---|
| preference: | 2 | 1 | 3 |
| Target: | D7 | E9 | |
| preference: | 2 | 1 | |

When a node detects a failure through an output port, it is designated as an arbitrator node. The arbitrator node uses the preferred node table for the output port through which the failure was detected to select the source node for the restoral route. For example, the preference indicator in the preferred node table above indicates that node B is the preferred source node for the restoral route when a failure is detected through output port 6 of node C. The preferred node table indicates that node E is the preferred target node of the restoral route when a node C is selected as the source node of a restoral route. Since two nodes may have multiple direct links between them, the preferred node table also identifies the output port of the node.

The following tables indicate sample preferred node tables.

| Preferred Node Table for Node A Port 2 | | | | |
|---|---|---|---|---|
| Source: | A2 | | | |
| preference: | 1 | | | |
| Target: | B3 | C5 | D7 | B9 |
| preference: | 3 | 4 | 2 | 1 |

| Preferred Node Table for Node B Port 4 | | | | |
|---|---|---|---|---|
| Source: | A2 | B4 | | |
| preference: | 2 | 1 | | |
| Target: | C5 | D7 | E9 | |
| preference: | 3 | 2 | 1 | |

| Preferred Node Table for Node C Port 6 | | | |
|---|---|---|---|
| Source: | A2 | B4 | C6 |
| preference: | 2 | 1 | 3 |
| Target: | D7 | L9 | |
| preference: | 2 | 1 | |

| Preferred Node Table for Node D Port 8 | | | | |
|---|---|---|---|---|
| Source: | A2 | B4 | C6 | D8 |
| preference: | 2 | 1 | 3 | 4 |
| Target: | E9 | | | |
| preference: | 1 | | | |

The following table lists the messages that are used to establish a restoral route.

| Message | Description |
|---|---|
| Alarm-in-Signal (AIS) | Indicates that the link on which this message is received has failed. |
| Regenerated Alarm (RGA) | Indicates that a failure has occurred on a link of the current route that is not directly connected to the node that receives the message. |

-continued

| Message | Description |
| --- | --- |
| Source Node Identification (SNI) | Identifies the node that is selected as the source node for the restoral route. |
| Build Restoral Route (BRR) | Indicates that the node that receives this message should attempt to build a route to the target node identified in the message. |
| Build Restoral Route Unsuccessful (BRRU) | Indicates that a restoral route to the target node cannot be built using the output port on which the message was received. |
| Implement Route (IR) | Indicates that a restoral route has been built and that the node that receives the message should connect its ports to implement the route. |
| Source Node Unsuccessful (SNU) | Indicates that the source node could not establish a restoral route. |
| Completion (COM) | Indicates that a restoral route has been built and implemented. |
| Arbitrate (ARB) | Indicates that the last arbitrator node is to again be designated as the arbitrator node for the restoral route. |
| Clear (CLR) | Indicates that a node on the restoral route should restore its original connection. |

Figure 2A:
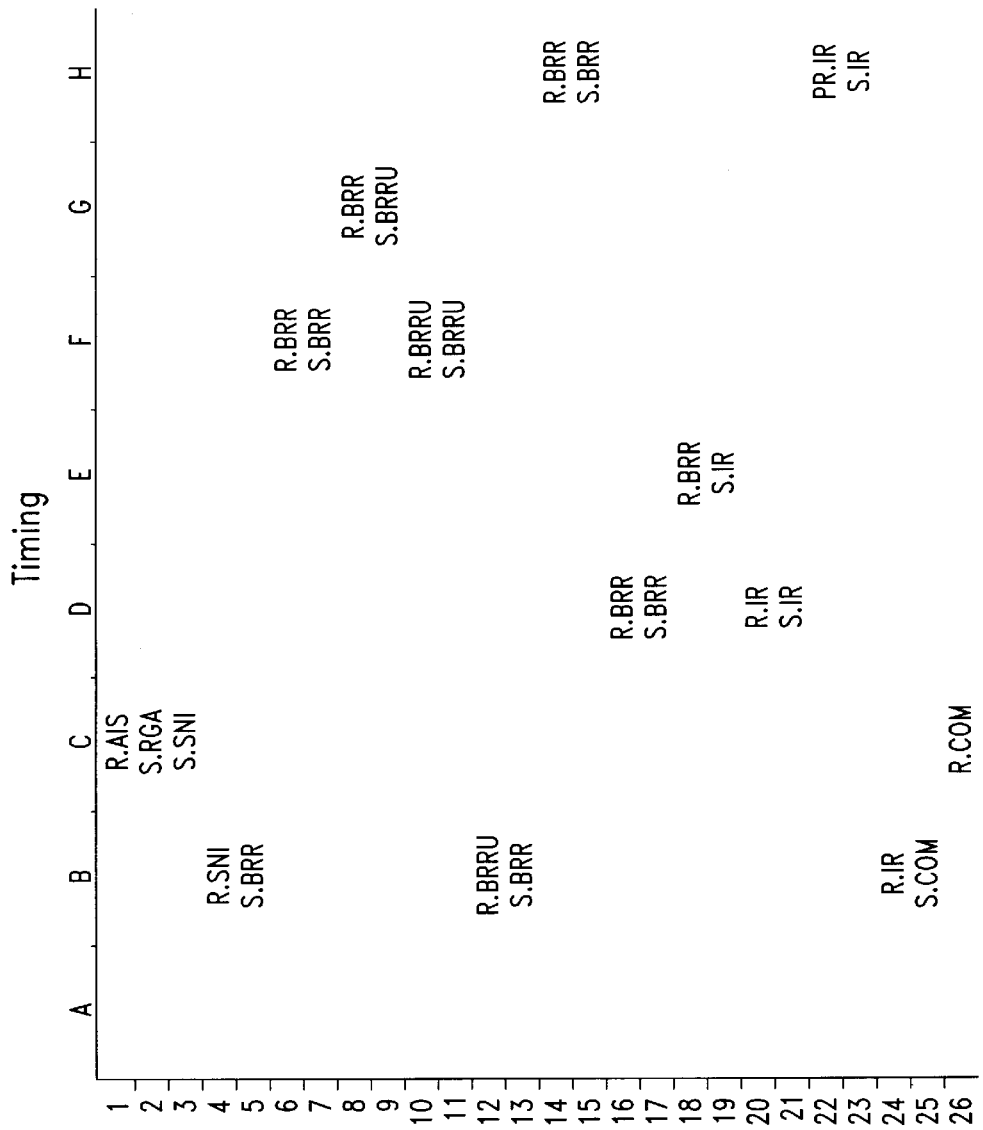
FIGS. 2A and 2B are diagrams that illustrates the sequence of messages sent between nodes when establishing a restoral route.

FIG. 2A is a diagram that illustrates the sequence of messages sent between nodes when establishing a restoral route. The horizontal axis of the diagram identifies the nodes and the vertical axis identifies a sequential numbering of the messages that are sent. When an intersection of a row and a column contains an identification of a message, then that node either received or sent that message. For example, the intersection of the column for node C and the row for sequence number 3 contains "S.SNI," which indicates that node C sent ("S") a source node identification ("SNI") message as the $3^{rd}$ message event in the sequence of messages. Also, the intersection of the column for node B and the row for sequence number 4 contains "R.SNI," which indicates that node B received ("R") a source node identification message ("SNI") as the $4^{th}$ message event in the sequence.

The sequences of message starts when node C receives an Alarm-in-Signal message indicating that a failure has occurred. Node C then sends a Regenerated Alarm message as the $2^{nd}$ message event through its input port 5 to notify the other nodes on the current route that a failure has been detected. (The receiving and forwarding of the Regenerated Alarm messages along the current route are not illustrated in the diagram.) Node C identifies a source node and sends a Source Node Identification message to the source node as the $3^{rd}$ message event. Node B receives the Source Node Identification message as the $4^{th}$ message event that node C sent as the $3^{rd}$ message event. In response, node B selects a target node from its preferred node table for output port 4, selects an output port from its preferred node table as the target node, selects output port 24 for attempting to establish a restoral route around node C, and then, and sends a Build Restoral Route message through the selected output port to node F as the $5^{th}$ message event. Node F receives the Build Restoral Route message as the $6^{th}$ message event, selects an output port, and sends a Build Restoral Route message through that selected output port to node G as the $7^{th}$ message event. Node G receives the Build Restoral Route message as the $8^{th}$ message event and determines that it cannot complete the connection to the target node E. Consequently, node G sends a Build Restoral Route Unsuccessful message back to node F as the $9^{th}$ message event. Node F receives the Build Restoral Route Unsuccessful message as the $10^{th}$ message event and forwards the Build Restoral Route Unsuccessful message to node B as the $11^{th}$ message event. Node B receives the Build Restoral Route Unsuccessful message as the $12^{th}$ message event, selects another output port through which to establish the restoral route from its preferred route table for the target node, and sends a Build Restoral Route message via output port 19 to node H as the $13^{th}$ message event. Node H receives the Build Restoral Route message as the $14^{th}$ message event and sends the Build Restoral Route message to node D as the $15^{th}$ message event. Node D receives the Build Restoral Route message as the $16^{th}$ message event and sends a Build Restoral Route message to node E as the $17^{th}$ message event. Node E receives the Build Restoral Route message as the $18^{th}$ message event and, since it is the target node, then the route has been successfully built. Node E implements its portion of the route and then sends an Implement Route message to route D as the $19^{th}$ message event. The $20^{th}$ to $23^{rd}$ message event occur in nodes D and H as shown in FIG. 2A. Each node in the restoral route receives the Implement Route message, implements its part of the route, and forwards the message. Node B eventually receives the Implement Route message as the $24^{th}$ message event and, since it is the source node, it sends a Complete message to node C as the $25^{th}$ message event.

Figure 2B:
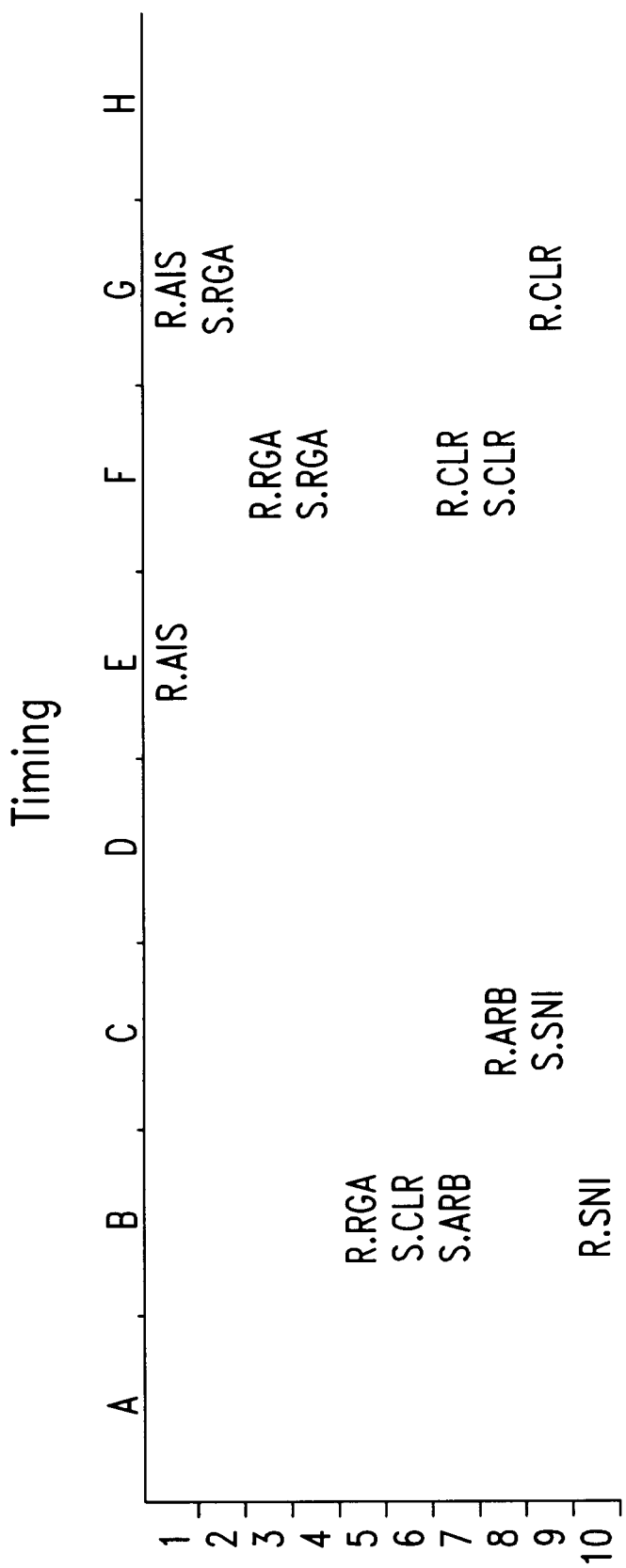

FIG. 2B is a diagram that illustrates the sequences of messages sent when a failure is detected on a restoral route. In the example of FIG. 2B, the restoral route is B-F-G-E and the failure occurs on the link between nodes G and E. The sequences of messages starts when nodes G and E receive an AIS message indicating that a failure has occurred. Since node G is on the restoral route, it does not designate itself as the arbitrator node. Node G, however, sends an RGA message as the $2^{nd}$ message event through its input port 14 to node F. When node F receives the RGA message as the $3^{rd}$ message event, node F forwards the RGA message through its output port 23 to node B as the $4^{th}$ message event. When node B receives the RGA message as the $5^{th}$ message event, node B determines that it is the source node of the restoral route. Node B then sends a Clear ("CLR") message through output port 24 to node F as the $6^{th}$ message event. Node B connects input port 3 to output port 4 and sends an Arbitrate ("ARB") message through output port 4 to node C as the $7^{th}$ message event. When node C receives the ARB message as the $8^{th}$ message event, node C designates itself as the arbitrator node, selects node B as the preferred source node, and sends an SNI message, such as "R.CLR" to node B as the $9^{th}$ message event as shown in FIG. 2B. When node B receives the SNI message as the $10^{th}$ message event, node B selects a target node and starts the process of building a restoral route. The CLR message that was sent to node F as the $6^{th}$ message event is also received as the $7^{th}$ message event which occurs in parallel to node B sending the ARB message. When the nodes or the restoral route receive the CLR message and restore their original connection to forward the message. When the target node of the restoral route, node E, receives a message (AIS or RGA) indicating that a failure is detected, the target node restores its connection to that of the original route. Since node E receives the AIS message, there are no nodes on the restoral route between it and the failure. Consequently, node E does not send a clear message onto the restoral route.

Figure 3:
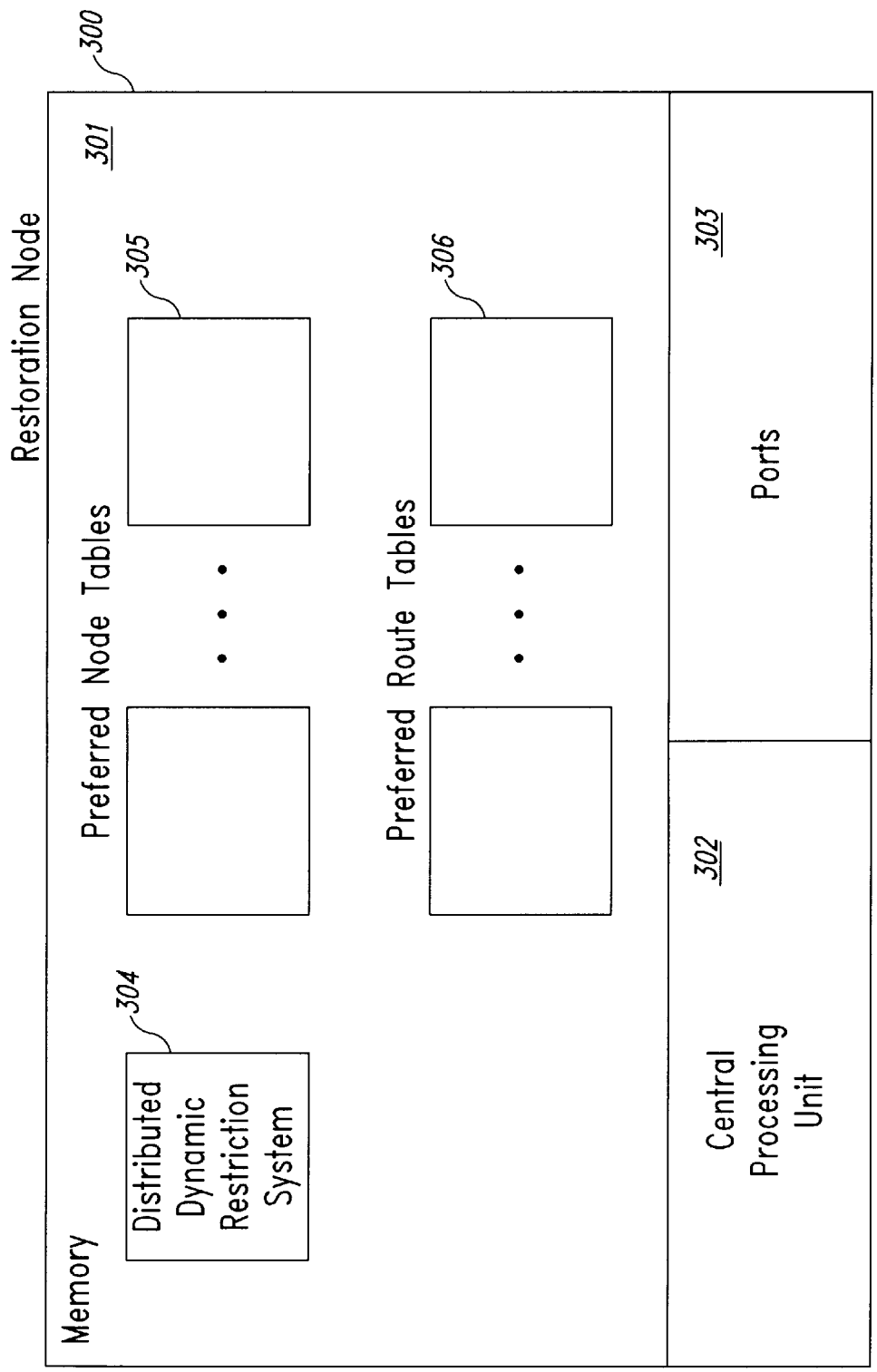
FIG. 3 is a block diagram illustrating the components of a restoration node.

FIG. 3 is a block diagram illustrating the components of each restoration node. The restoration node 300 comprises a memory 301, a central processing unit 302, and ports 303. The memory contains the DDR system 304, the Preferred Node Tables 305, and the Preferred Route Tables 306. The central processing unit controls the execution of the instructions of the DDR system to effect the sending and receiving of the restoral messages through the ports and the connecting of ports to implement restoral routes. The ports can be designated as either input and output and an input port can be selectively connected to an output port. The DDR system includes modules for sending, receiving, and processing messages. FIGS. 4–12 are flow diagrams of an implementation of the routines of the DDR system. One skilled in the art would appreciate that various other organization of functionality into routines could be used.

Figure 4A:
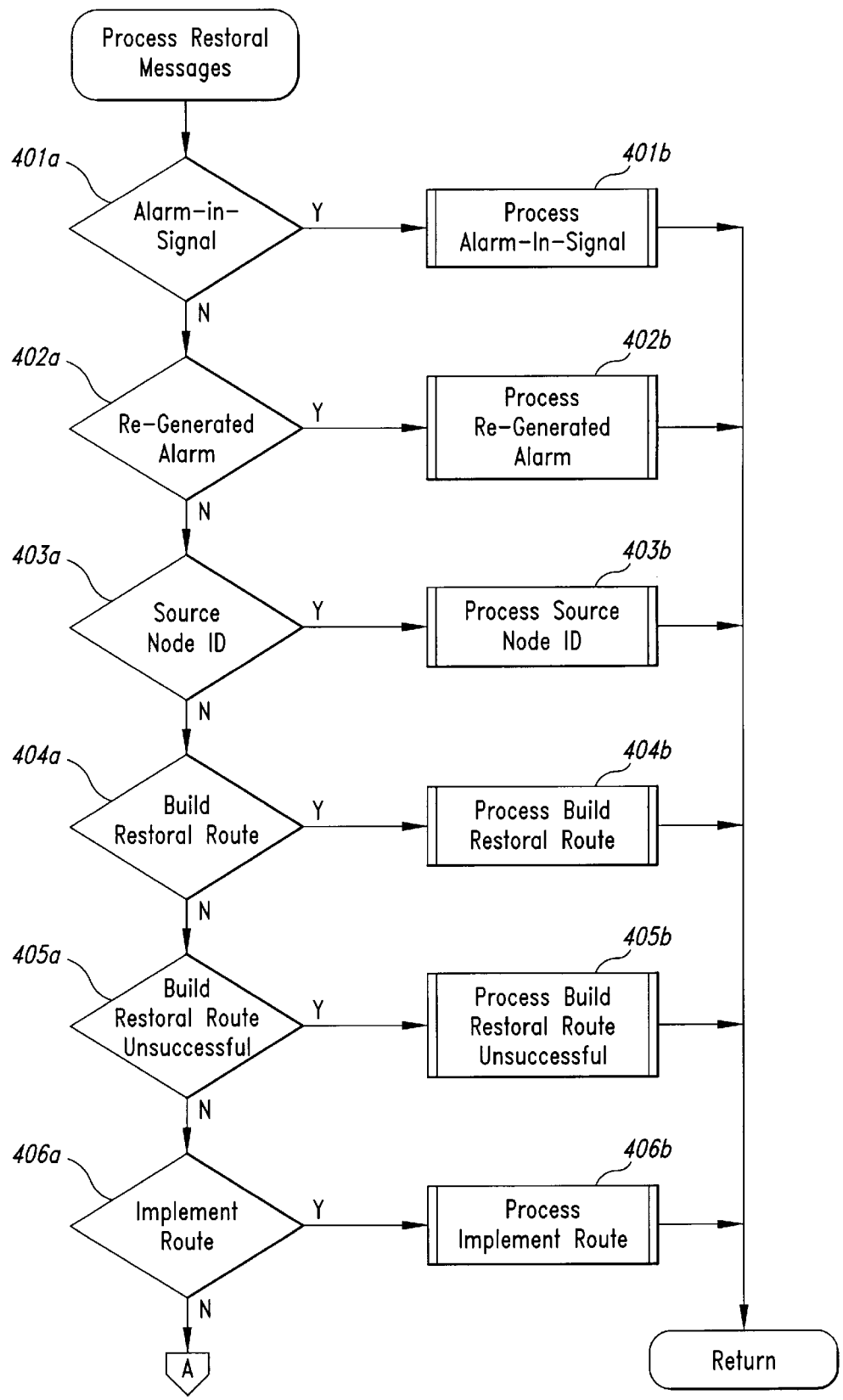
FIGS. 4A and 4B are flow diagrams of an implementation of a Process Restoral Message routine.
Figure 4B:
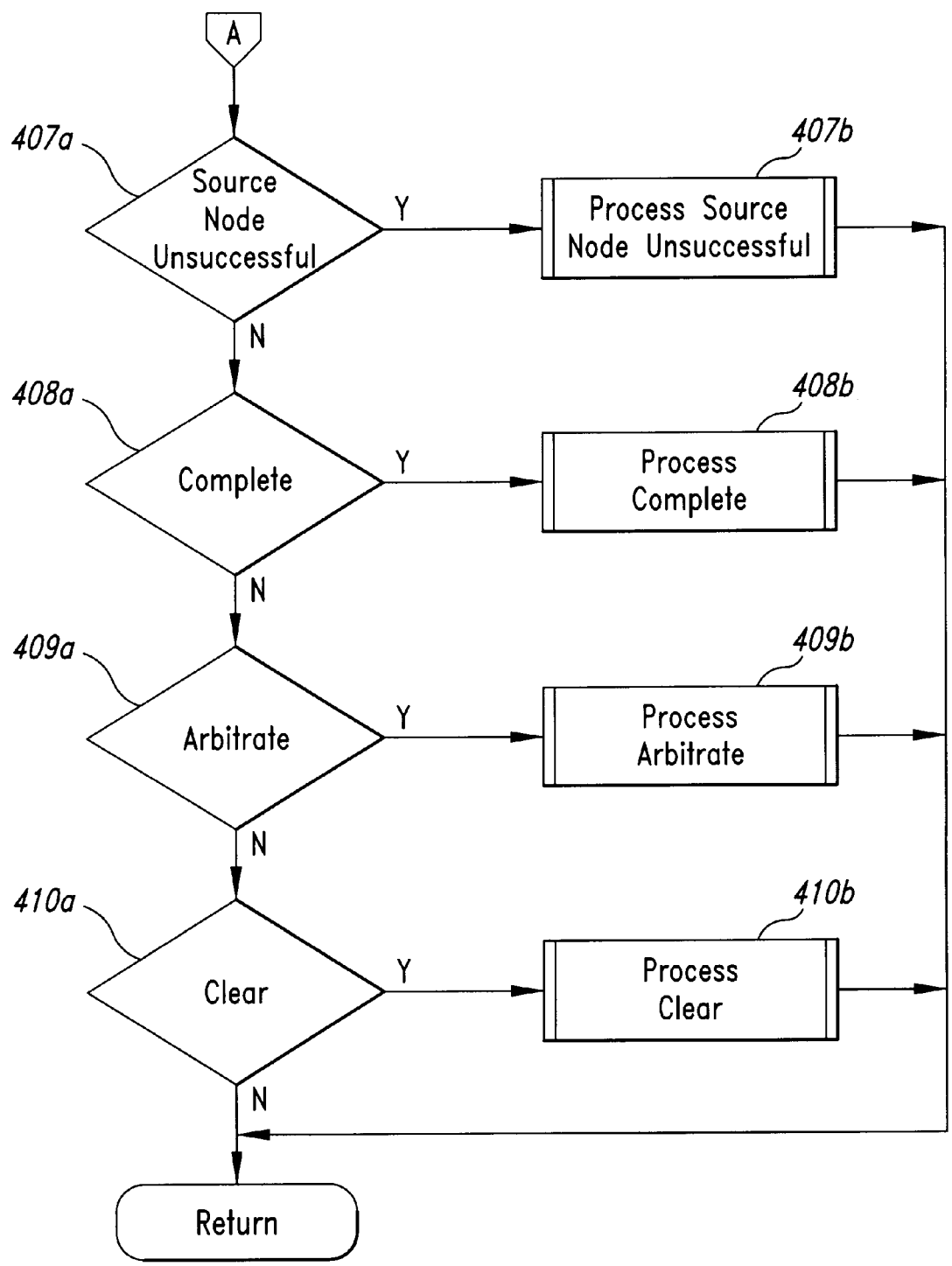

FIGS. 4A and 4B are flow diagrams of an implementation of a Process Restoral Message routine. The Process Restoral Message routine receives the various restoral messages and determines the message type in steps 401A–410A. The routine invokes the appropriate message processing routine in steps 401B–410B.

Figure 5:
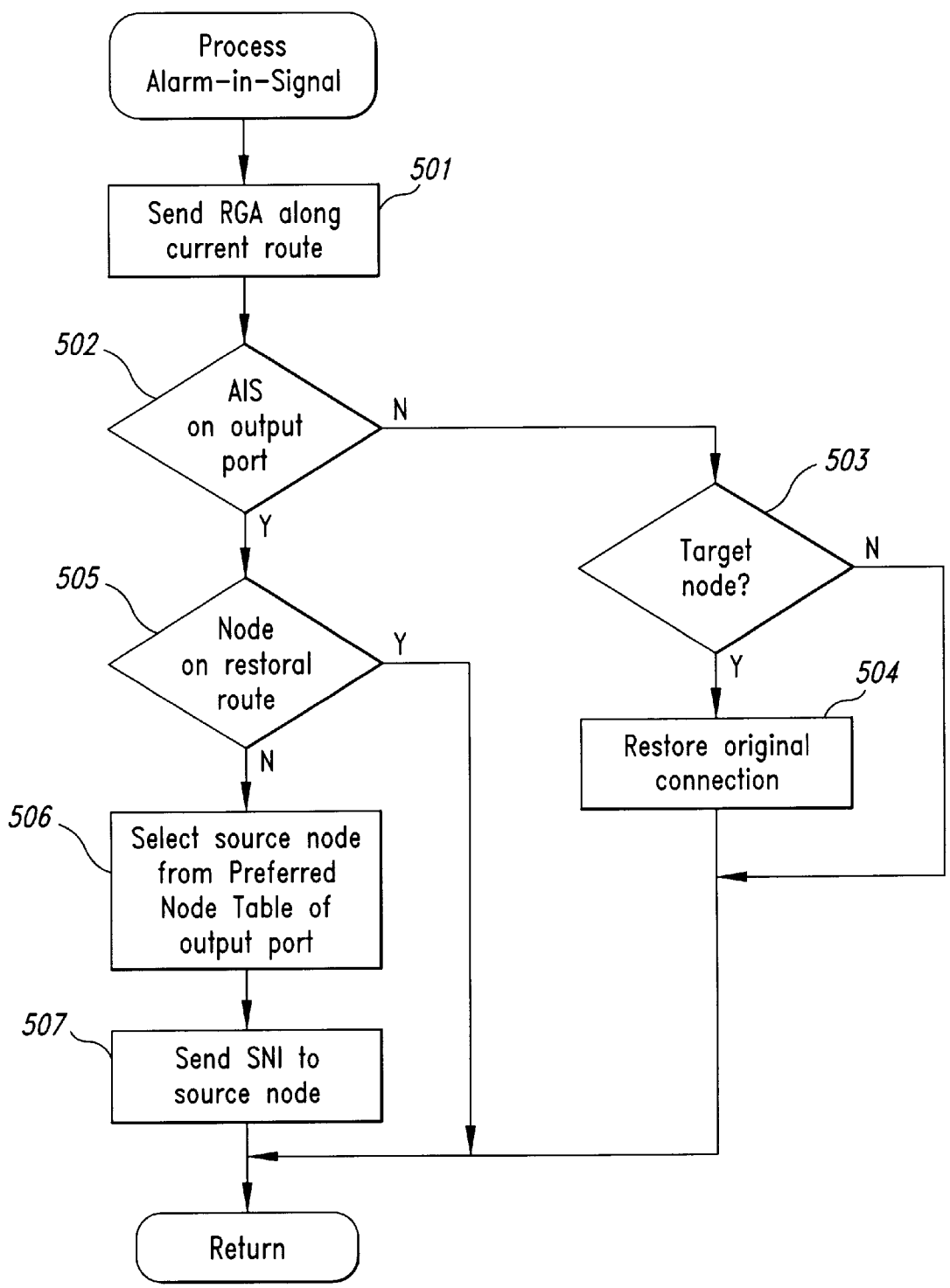
FIG. 5 is a flow diagram of an implementation of the Process Alarm-in-Signal Message routine.

FIG. 5 is a flow diagram of an implementation of the Process Alarm-in-Signal Message routine. This routine is executed when an AIS message is received. This routine sends an RGA message through its input port or output port of the current route to notify the other nodes of the failure. If this node is to be designated as the arbitrator node, it selects a source node for a restoral route and sends an SNI message to the source node. If the AIS was received on the input port and this is the target node, then it restores its original connection. In step 501, the routine sends the RGA message through the port of the current route. In step 502, if the AIS message was received through an output port of this node, then the routine continues at step 505, else the routine continues at step 503. In step 503, if this node is a target node, then the routine continues at step 504, else the routine returns. In step 504, the routine restores the original connection and returns. In step 505, if this node is on the restoral route, then the routine returns, else this node is designated as the arbitrator node for establishing a restoral route and continues at step 506. In step 506, the routine selects the highest preference source node in the Preferred Node Table for the output port through which the AIS message was received as the source node for the restoral route. In step 507, the routine sends a Source Node Identification message to the source node and returns. The arbitrator sends the message through its input port of the original route. Each non-source node that receives the SNI message forwards the message until it is eventually received by the source node.

Figure 6:
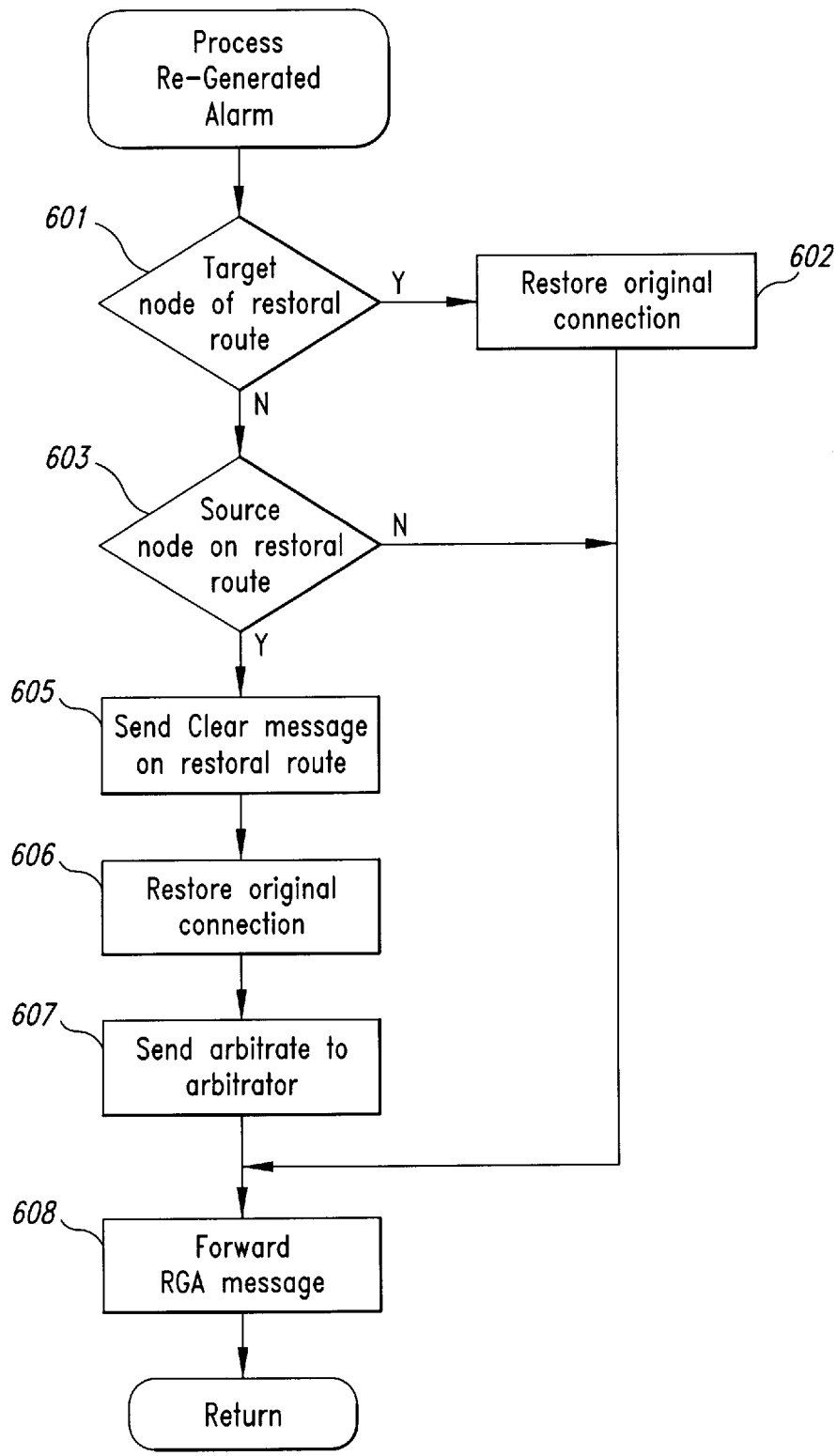
FIG. 6 is a flow diagram of an implementation of the Process Regenerated Alarm Message routine.

FIG. 6 is a flow diagram of an implementation of the Process Regenerated Alarm Message routine. In step 601, if this node is the target node of a restoral route, then the routine restores the original connection in step 602, else the routine continues at step 603. In step 603, if this is the source node of a restoral route, then the routine continues at step 605, else the routine continues at step 608. In step 605, the routine sends the Clear message along the restoral route. In step 606, the routine restores the original connection of the source node. In step 607, the routine sends an Arbitrate message to the last arbitrator node. In step 608, the routine forwards the RGA message and returns.

Figure 7:
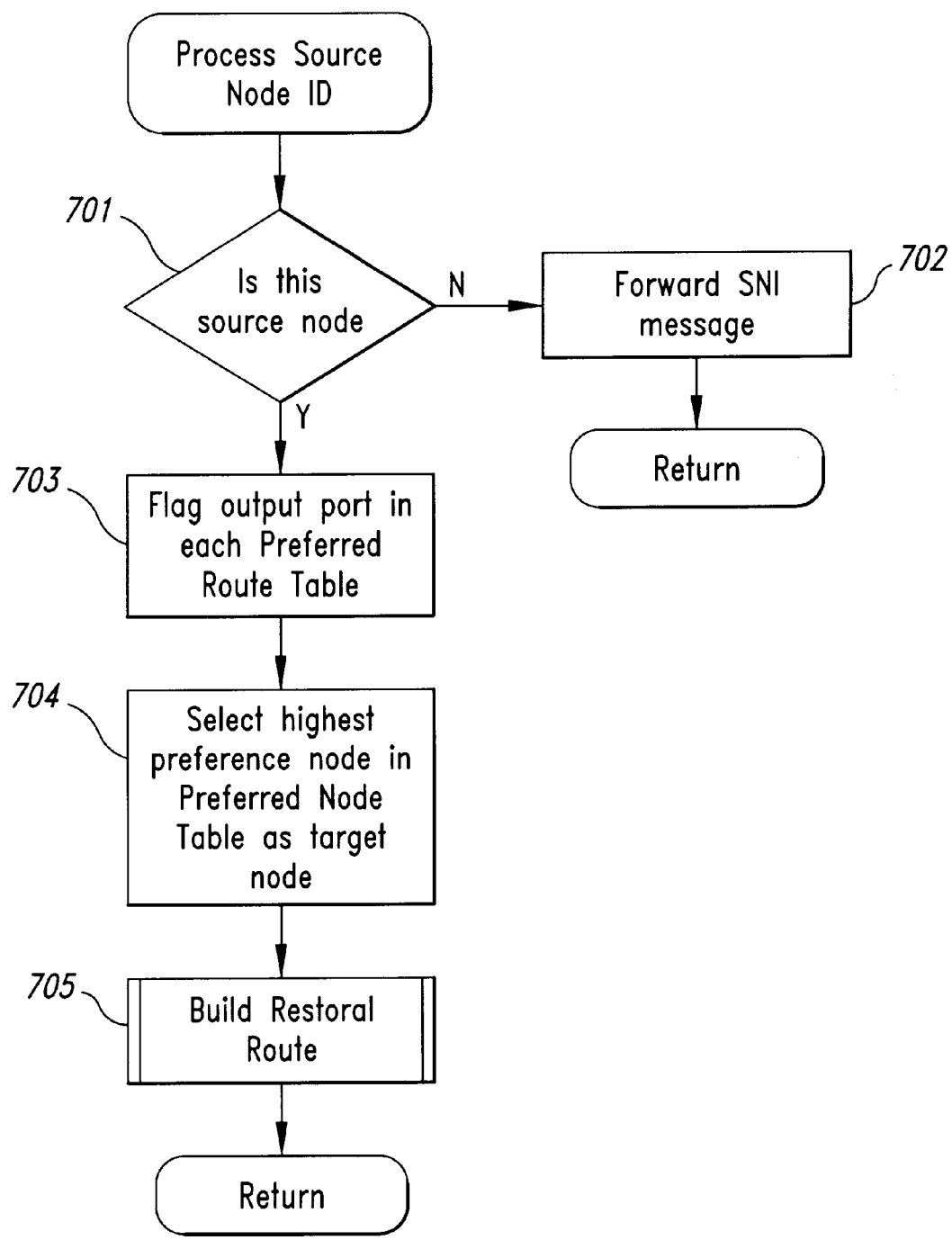
FIG. 7 is a flow diagram of an implementation of the Process Source Node Identification Message routine.

FIG. 7 is a flow diagram of an implementation of the Process Source Node Identification Message routine. The Source Node Identification message contains the identification of the arbitrator node and the source node. If this node is not the source node, then this node forwards the message to the source node. In step 701, if this node is the source node, then the routine continues at step 703, else the routine continues at step 702. In step 702, the routine forwards the SNI message through the input port of the current route and returns. In step 703, the routine flags the output port through which the SNI message was received in each Preferred Route Table. This output port is not to be used when establishing the restoral route. In step 704, the routine selects the highest preference node in the Preferred Node Table for the output port on which this message was received as the target node. Thus, this source node will attempt to establish a restoral route from this node to the target node. In step 705, the routine invokes the Build Restoral Route routine and returns.

Figure 8:
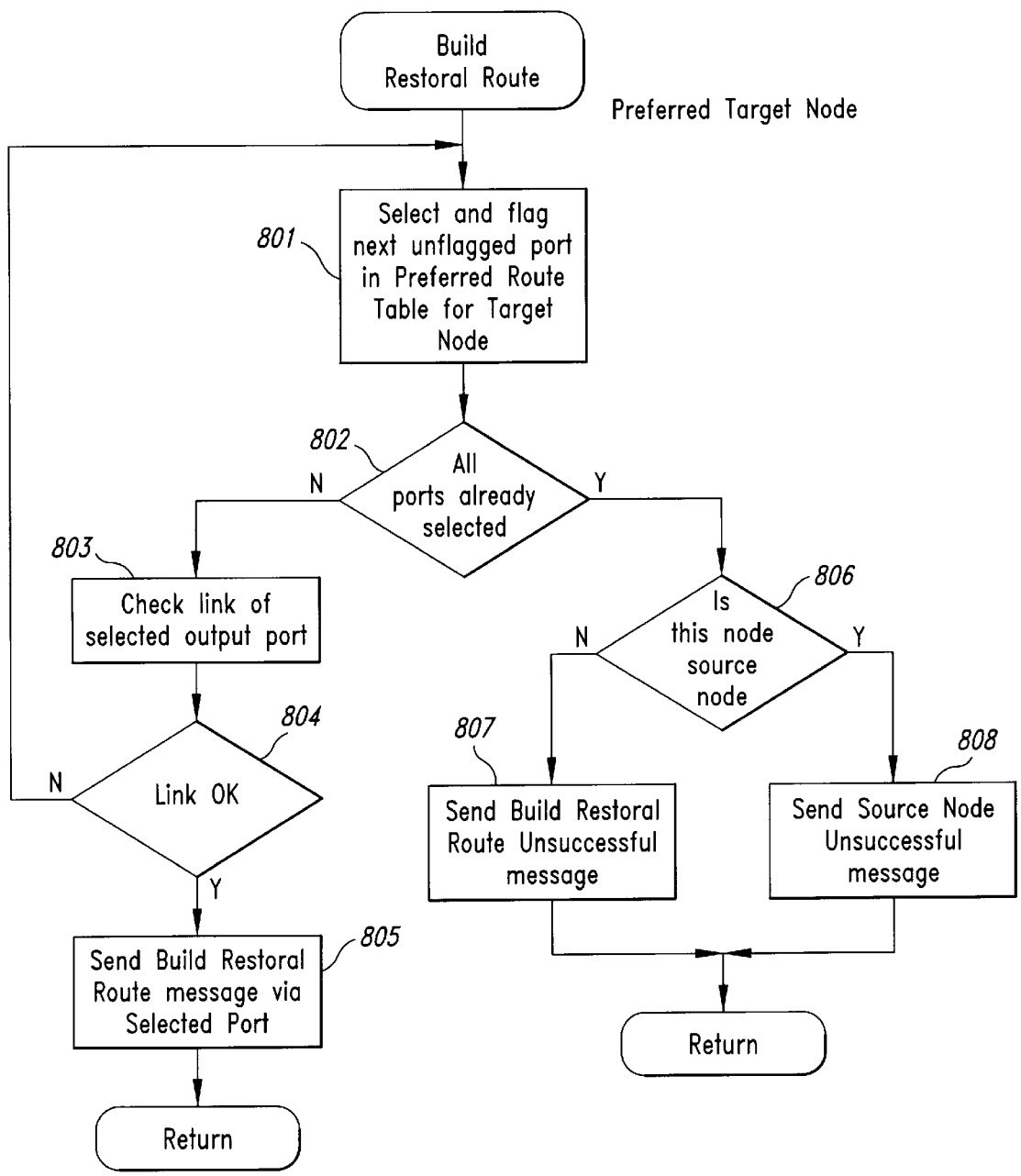
FIG. 8 is a flow diagram of an implementation of the Build Restoral Route routine.

FIG. 8 is a flow diagram of an implementation of the Build Restoral Route routine. This routine is passed the identification of the target node and attempts to build a restoral route from this node to the target node. The routine successively sends requests through output ports identified in the Preferred Route Table for the target node until an Implement Route message is received or the node determines that no restoral route can be built through this node to the target node. This routine may be implemented as a state machine whose state is kept tracked by flagging the ports in the Preferred Route Table for the target node through which an attempt has already been made to establish a restoral route. This routine is invoked when various messages are received and processes based on the then current state. In step 801, the routine selects and flags the next unflagged port in the Preferred Route Table for the target node. In step 802, if all the ports in the Preferred Route Table have already been flagged, then no restoral through this node route to the target node can be built and the routine continues at step 806, else the routine continues at step 803. In step 803, the routine checks the link connected to the selected output port. In step 804, if the link has not failed, then the routine continues at step 805, else the routine loops to step 804 to select the next output port. In step 805, the routine sends a Build Restoral Route message through the selected output port and returns. In step 806, if this node is the source node, then the routine continues at step 808, else the routine continues at step 807. In step 807, the routine sends a Build Restoral Route Unsuccessful message through the input port through which the last Build Restoral Route was received and returns. In step 808, since this is the source node and no restoral route can be established, the routine sends a Source Node Unsuccessful message to the arbitrator node and returns.

Figure 9:
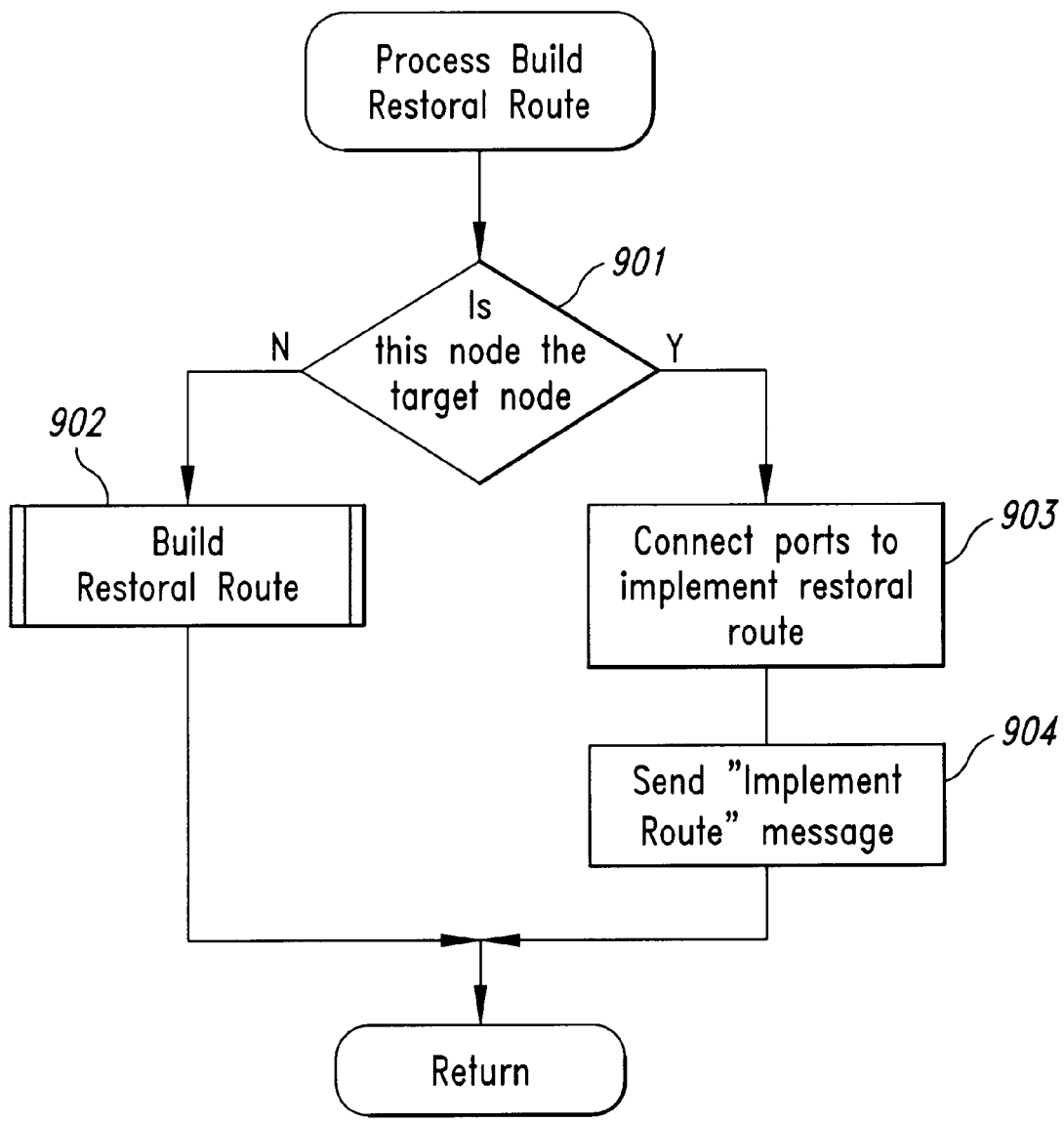
FIG. 9 is a flow diagram of an implementation of the Process Build Restoral Route Message routine.

FIG. 9 is a flow diagram of an implementation of the Process Build Restoral Route Message routine. This routine is passed the identification of the target node and either continues to build the restoral route or, if this node is the node is the target node, starts the implementation of the restoral route. In step 901, if this node is the target node, then the restoral route has been built and the routine continues at step 903, else the routine continues at step 902. In step 902, the routine invokes the Build Restoral Route routine and returns. In step 903, the routine connects the input port through which the Build Restoral Route message was received to the output port of the current route to implement its portion of the restoral route. In step 904, the routine sends an Implement Route message through the input port through which the Build Restoral Route message was received and returns.

Figure 10:
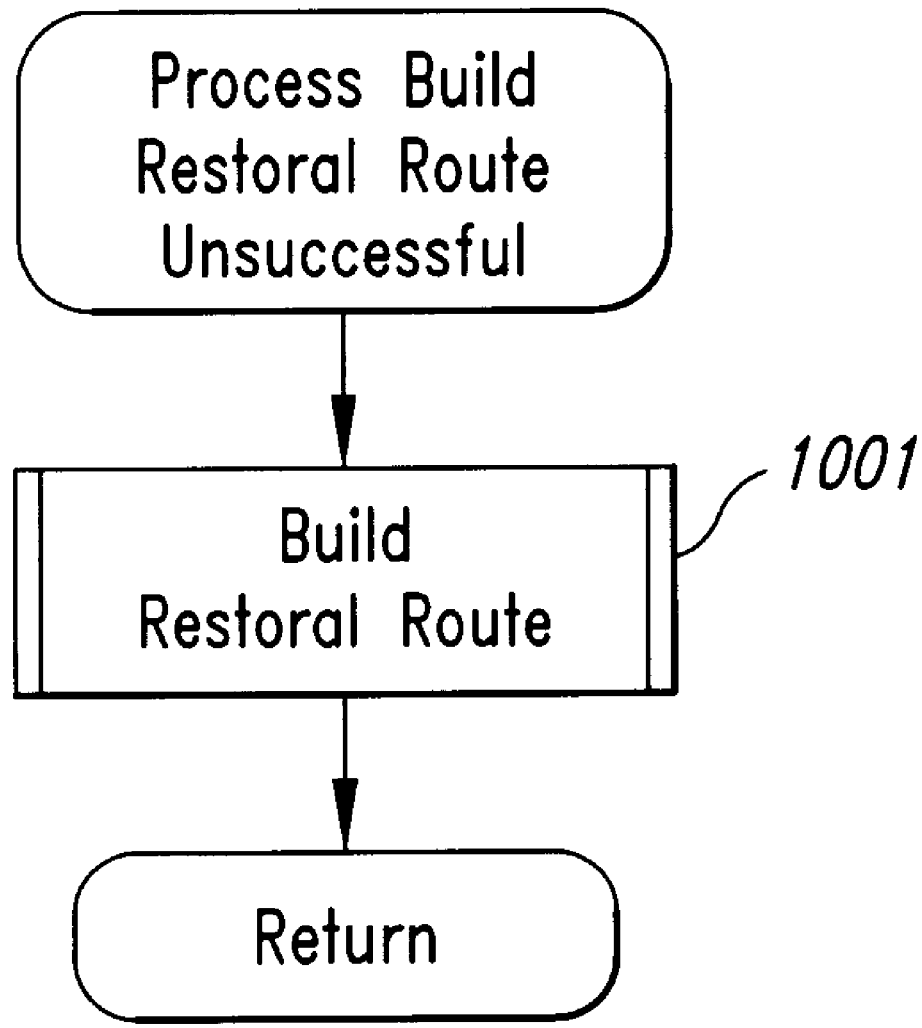
FIG. 10 is a flow diagram of an implementation of the Process Build Restoral Route Unsuccessful Message routine.

FIG. 10 is a flow diagram of an implementation of the Process Build Restoral Route Unsuccessful Message routine. When the BRRU message is received, the node continues to attempt to establish a route to the target node through another candidate output port. In step 1001, the routine invokes the Build Route Restoral routine and returns.

Figure 11:
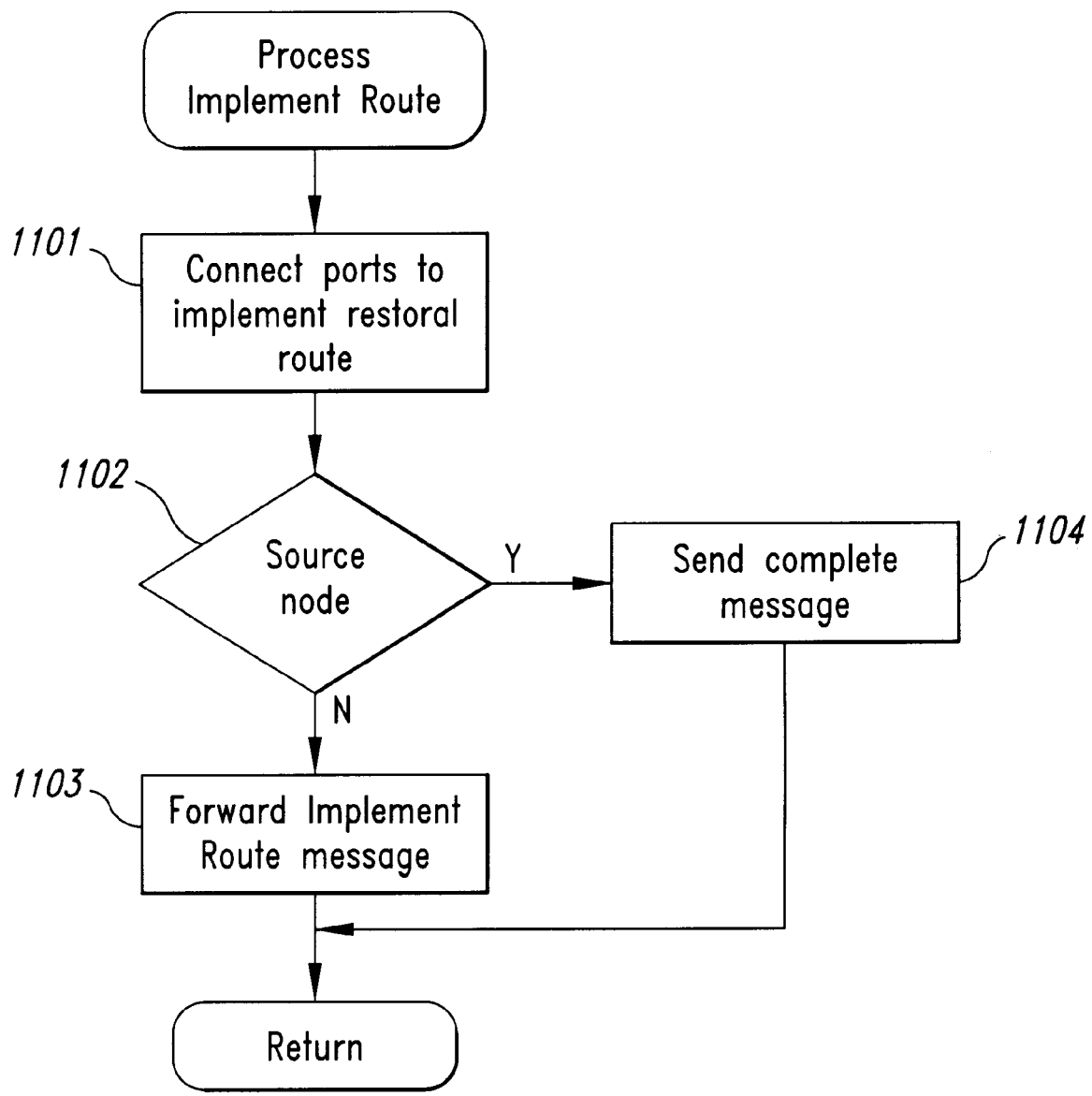
FIG. 11 is a flow diagram of an implementation of the Process Implement Route Message routine.

FIG. 11 is a flow diagram of an implementation of the Process Implement Route Message routine. This routine connects the ports to implement the restoral route and forwards the IR message through the input port through which the last BRR message was received. In step 1101, the routine connects input port through which the BRR message was received (or the input port of the current route, if the source node) to the output port through which the IR message was received to implement the restoral route. In step 1102, if this node is the source node, then the routine continues at step 1104, else the routine continues at step 1103. In step 1103, the routine sends an Implement Route message through the input port through which the BRR message was received and returns. In step 1104, the routine sends a Complete message to the arbitrator node and returns.

Figure 12:
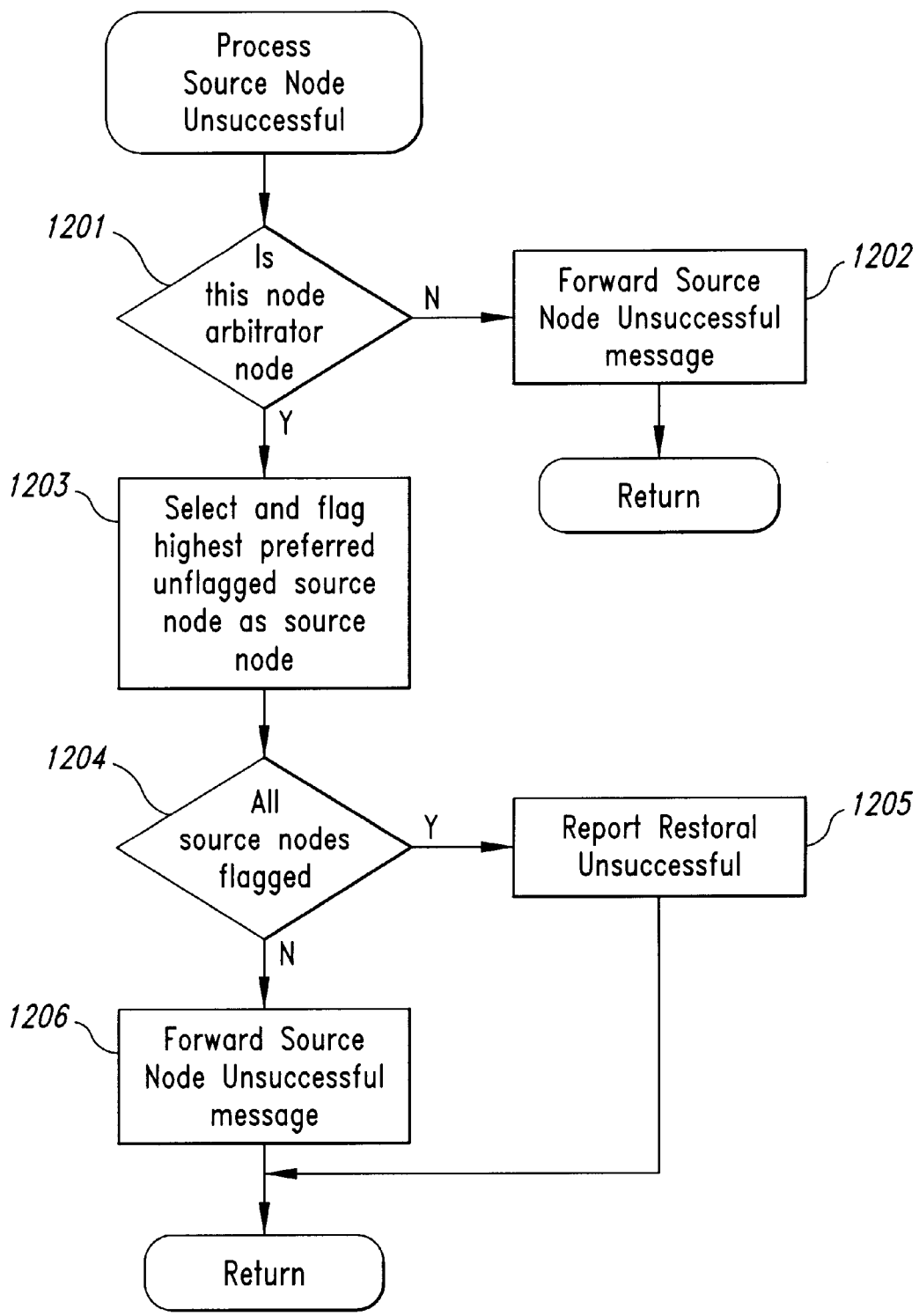
FIG. 12 is a flow diagram of an implementation of the Process Source Node Unsuccessful Message routine.

FIG. 12 is a flow diagram of an implementation of the Process Source Node Unsuccessful Message routine. When the arbitrator node receives the SNU message, it selects another source node for establishing a restoral route. In step 1201, if this node is the arbitrator node, then the routine continues at step 1203, else the routine continues at step 1202. In step 1202, the routine forwards the Source Node Unsuccessful message through the output port of the current route and returns. In step 1203, the routine selects and flags the next highest preference unflagged source node in the Preferred Node Table for the output port through which the AIS message was received as the preferred source node. In step 1204, if all the source nodes have already been flagged, then the routine continues at step 1205, else the routine continues at step 1206. In step 1205, the routine reports that the restoral was unsuccessful and returns. In step 1206, the routine sends a Source Node Identification message to the source node to again attempt to establish a restoral route and returns.

Figure 13:
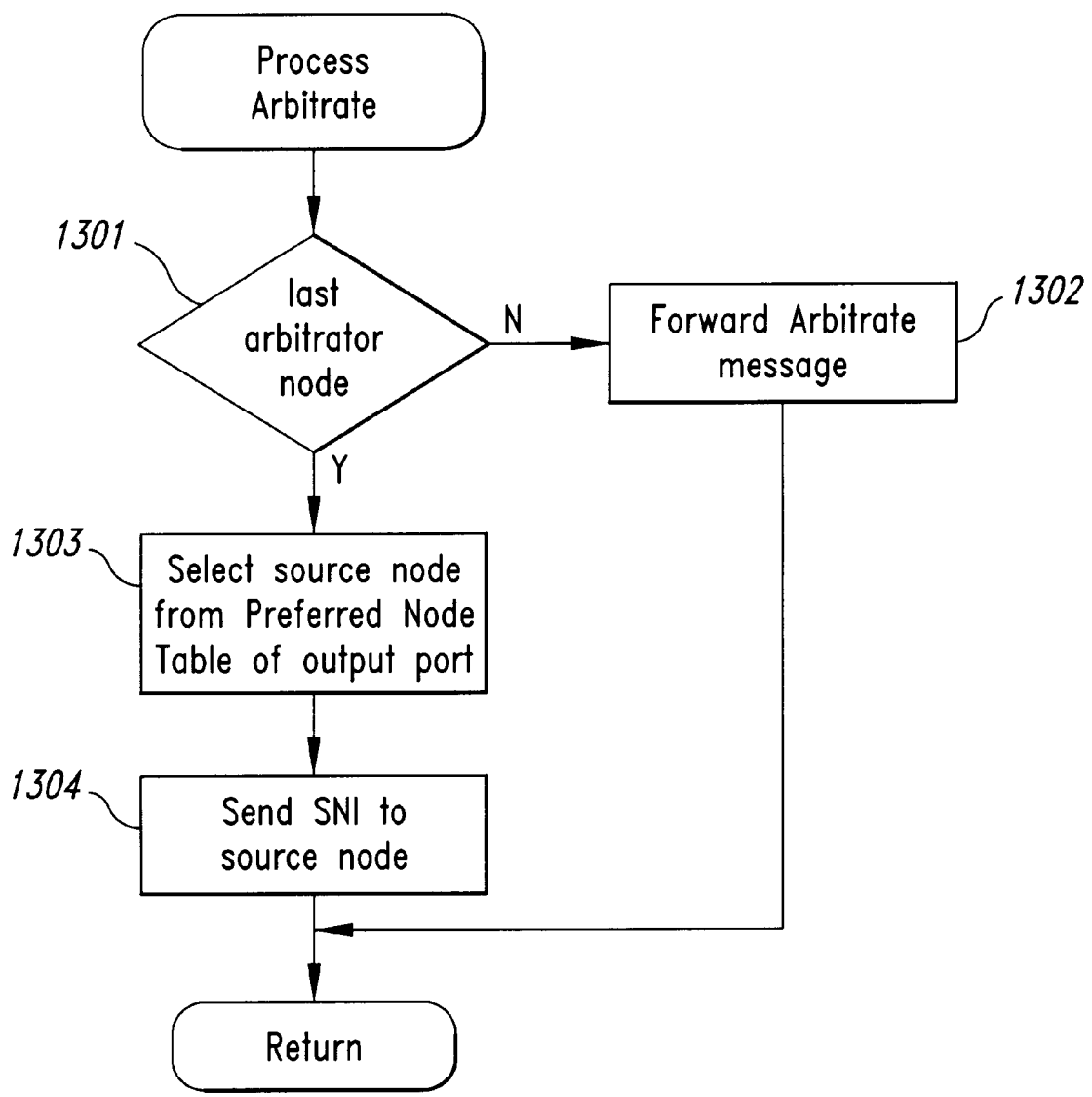
FIG. 13 is a flow diagram of an implementation of the Process Arbitrate Message routine.

FIG. 13 is a flow diagram of an implementation of the Process Arbitrate Message routine. In step 1301, if this is the last arbitrator node, then the routine continues at step 1303, else the routine forwards the Arbitrate Message in step 1302 and returns. In step 1303, the routine selects the source node from the preferred source node table of the output port from which the last AIS message was received. In step 1304, the routine sends a Source Node Identification message to the selected source node and returns.

Figure 14:
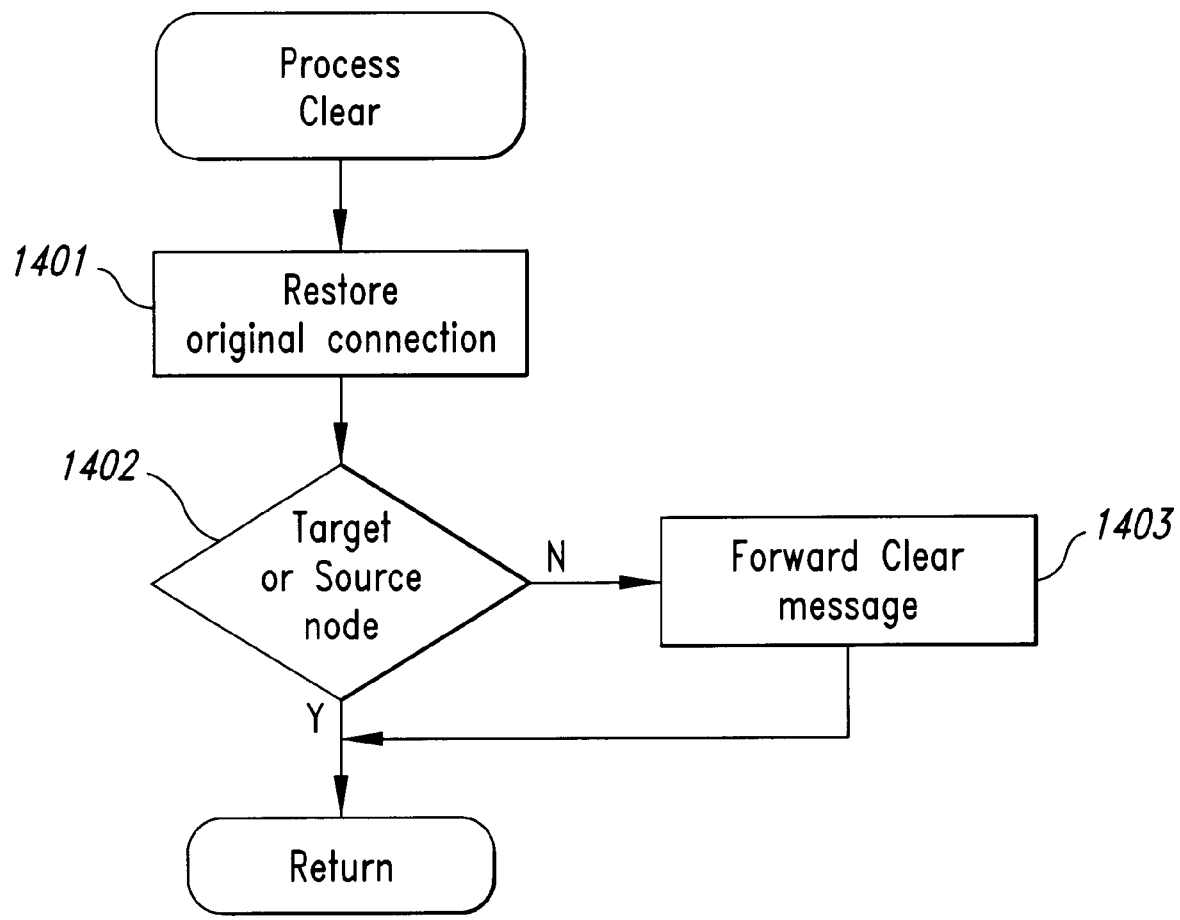
FIG. 14 is a flow diagram of an implementation of the Process Clear Message routine.

FIG. 14 is a flow diagram of an implementation of the Process Clear Message routine. In step 1401, the routine restores the original connection. In step 1402, if this node is the source or target node of the restoral route, then the routine returns, else the routine forwards the Clear message along the restoral route in step 1403 and then returns.

The present invention may also be described in terms of traversal of a graph comprising nodes and links. (An active link is a link that has not failed.) The DDR system proceeds with a depth first traversal of the graph from the source node to the target node. The order of selection of the output links is governed by the preferred route tables for the target node at each node visited. The traversal is depth first in the sense that each node is visited (e.g., sent a Build Restoral Route message) in a depth first manner. That is, a parent node is visited then a child is visited, then a grandchild node is visited until a node being visited indicates that the restoral route to the target node cannot built through it. In such a case, the parent node of that child node would then select another child node. Alternatively, the restoration route could be built by visiting child nodes in parallel. That is, a parent node could send a message to each of its child nodes (through its candidates output ports) and wait until either all child nodes reply or one replies that it was successful.

Although the present invention has been described in terms of one embodiment, it is not intended that the invention be limited to this embodiment. Modifications within the spirit of the invention would be apparent to those skilled in the art. For example, the present invention can be used to identify routes in general for any type of communications network (e.g., Internet or other computer-based network). The scope of the present invention is defined by the claims that follow.

I claim:

1. A method for selecting an arbitrator node to control the identifying a restoral route to bypass a failed component in a communications network, the network having components that include nodes and links, each link connected to a node being either an input link or an output link for that node, the method comprising:

when a failure of a component is detected on an original route, designating as the arbitrator node the node that detects the failure through its output link; and when a failure of a component is detected on a restoral route that was identified to bypass another failed component, designating as the arbitrator node the node that that was the arbitrator node for identifying the restoral route to bypass the other failed component wherein the arbitrator node selects a source node for the restoral route to be identified, the source node being a first node of the restoral route to bypass the failed components.

2. The method of claim 1, including:

under control of the arbitrator node, selecting a source node;

under control of the source node, selecting a target node;

under control of the source node, requesting the nodes connected to the output links of the source node to identify a restoral route to the target node; and under control of each node that is requested to identify a target node, when the node is not the target node, requesting the nodes connected to its output links to establish a restoral route to the target node; and when the node is the target node, indicating that the restoral route has been identified.

3. The method of claim 2 wherein when the failure is detected on a restoral route, the node that detects the failure notifies the source node of that restoral route, notifies the arbitrator node for that restoral route.

4. The method of claim 2 wherein each node includes an indication of preferred source node to when that node is designated as an arbitrator node and includes an indication of preferred target nodes for when that node is designated as a source node.

5. The method of claim 2 wherein each output link of each node has a preferred source node such that when a failure is detected on that output link that preferred source node is selected as the source node for identifying the restoral route.

6. The method of claim 2 wherein each output link of each node has a preferred target node such that when that node is selected as the source node of a restoral route, that preferred target node for the output link that the restoral route is to bypass is selected as the target node for identifying the restoral route.

7. The method of claim 2 wherein each node in the network has for each other node in the network a preferred output link such that when the other node is selected as a target node, the node connected to the preferred output link is first requested to identify a restoral route.

8. The method of claim 2 wherein the selection of a source and a target node are based on predetermined preferred source and target nodes.

9. The method of claim 2, including when a node that is requested to identify a restoral route to the target node cannot identify such a restoral route through its output links, notifying the node that sent the request that such a restoral route cannot be identified through that node.

10. The method of claim 2 wherein when the source node is notified that a restoral route cannot be identified through an output link, the source node then requests the node connected to another of its output links to identify a restoral route to the target node.

11. The method of claim 2 wherein when a restoral route to the target node cannot be identified from the source node to the target node, selecting another node as the target node and requesting the nodes connected to the output links of the source node to identify a restoral route to the newly selected target node.

12. The method of claim 2 wherein when no restoral route from the source node can be identified, selecting another source node.

13. A communications network having a distributed dynamic restoration system that executes at each node in the network for identifying a restoral route to bypass a failure in an original route of the network, the network having nodes and links, the restoration system comprising:
   an arbitrator component for designating that the node is an arbitrator node when the node is on the original route and detects a failure through an output link and when the node is notified that it should be designated as the arbitrator node, for selecting a source node of a restoral route, and for notifying the selected source node that it has been selected as the source node;
   a build component for selecting output links of the node, for sending a message through the selected output links to identify a restoral route to a target node, and for receiving a message through the selected output link indicating whether a restoral route was identified;
   a source node component for receiving a notification that that node has been selected as a source node of the restoral route, for selecting a target node of the restoral route, for invoking the build component to identify a restoral route to the target node, for notifying the arbitrator node as to the success of identifying the restoral route, and for notifying an arbitrator node for an established restoral route when a failure is detected on the restoral route that that arbitrator node is to again be designated as the arbitrator node; and
   a control component for receiving through an input link a message to identify a restoral route to the target node, for invoking the build component to identify a restoral route to the target node, and for sending a message through the input link through which the message to identify a restoral route was received indicating whether a restoral route has been identified to the target node.

14. The system of claim 13, including a connection component for connecting an input link to an output link when a message through the selected output link indicating that a restoral route has been identifies is received.

15. The system of claim 14 wherein the nodes are restoration nodes of a telecommunications network.

16. The system of claim 13, including a preferred route table for each other node in the network, the preferred route table indicating the output links through which a restoral route can be identified to that other node.

17. The system of claim 13, including a preferred node table for each output link of that node, the preferred node table indicating a preferred source node for a restoral route when that node is the arbitrator node and indicating a preferred target node for a restoral route when that node receives a message that it is the source node of a restoral route.

18. A method for identifying a second restoral route that will bypass a failed component of a first restoral in a network, the network having components that include nodes and links, each link connected to a node being either an input link or an output link, the method comprising:
   at each of a plurality of nodes in the network,
      when a failure is detected on an output link and the node is not on the first restoral route, designating the node as an arbitrator node for the second restoral route;
      when a failure is detected in an output link and the node is on the first restoral route, effecting the redesignation of the node that was the arbitrator node for the first restoral route as the arbitrator node for the second restoral route;
      when the node is designated as the arbitrator node, selecting and notifying a source node;
      when a message to establish a restoral route through an input link to a target node is received at that node or that node is notified that it is the source node, sending a message to other nodes connected to output links of that node to establish a restoral route through the output link to the target node;
      when a message that a restoral route has been identified through an output link of that node to the target node is received at that node, sending a message that a restoral route has been identified from the input link to the target node, the message being sent to the node that sent the message to establish a restoral route; and
      when a message that a restoral route has not been identified through each output link of that node to the target node is received at that node, sending a message that a route has not been established to the target node, the message being sent to the node that sent the message to establish a restoral route.

19. The method of claim 18, including when a message that a restoral route has been identified through an output link of that node to the target node is received at that node, connecting the input link to that output link.

20. The method of claim 18 wherein the sending of messages to other nodes connected to the output links of that node to establish a restoral route is based on a predetermined ordering of the output links for the target node.

21. The method of claim 18 wherein the sending of the message to the other nodes connected to the output links of that node to establish a restoral route occurs in serial wherein such message is not sent to another node until a message that a restoral route has not been identified for that link is received.

22. The method of claim 18 wherein the sending of the message to the other nodes connected to the output links of that node to establish a restoral route occurs in parallel wherein such messages are sent to multiple nodes before a message that a restoral route has not been identified is received.

23. The method of claim 18, including when detecting that the component failed, selecting a node as a source node for the restoral route.

24. The method of claim 23 wherein the source node that is selected is predetermined for the output link for which the failure was detected.

25. The method of claim 23, including sending a message to the source node indicating that it was selected as the source node.

26. The method of claim 18, including when receiving a message that that node is selected as the source node, selecting a target node for the restoral route.

27. The method of claim 26 wherein the target node that is selected is predetermined for each output link.

* * * * *